(12) United States Patent
Ziegler

(10) Patent No.: US 11,499,990 B2
(45) Date of Patent: Nov. 15, 2022

(54) ATOMIC FORCE MICROSCOPE PROBES AND METHODS OF MANUFACTURING PROBES

(71) Applicant: Nanosurf AG, Liestal (CH)

(72) Inventor: Dominik Ziegler, Berkeley, CA (US)

(73) Assignee: Nanosurf AG, Liestal (CH)

( * ) Notice: Subject to any disclaimer, the term of this patent is extended or adjusted under 35 U.S.C. 154(b) by 0 days.

(21) Appl. No.: 16/699,612

(22) Filed: Nov. 30, 2019

(65) Prior Publication Data
US 2020/0124636 A1    Apr. 23, 2020

Related U.S. Application Data

(63) Continuation of application No. PCT/US2019/035119, filed on May 30, 2018.

(60) Provisional application No. 62/603,454, filed on May 30, 2017.

(51) Int. Cl.
*G01Q 70/14* (2010.01)
*G01Q 30/14* (2010.01)
*G01Q 70/02* (2010.01)
*G01Q 70/10* (2010.01)
*G01Q 60/24* (2010.01)

(52) U.S. Cl.
CPC ............. *G01Q 70/14* (2013.01); *G01Q 30/14* (2013.01); *G01Q 70/02* (2013.01); *G01Q 70/10* (2013.01); *G01Q 60/24* (2013.01)

(58) Field of Classification Search
CPC ........ G01Q 60/24; G01Q 60/40; G01Q 60/66; G01Q 30/14; G01Q 70/02; G01Q 70/10; G01Q 70/14
See application file for complete search history.

(56) References Cited

U.S. PATENT DOCUMENTS

| 8,136,385 B2* | 3/2012 | Adams | G01Q 60/42 73/31.05 |
|---|---|---|---|
| 2004/0140424 A1 | 7/2004 | Kwon et al. | |
| 2004/0202226 A1* | 10/2004 | Gianchandani | G01Q 60/58 374/185 |
| 2006/0213259 A1* | 9/2006 | Prinz | G01Q 60/38 73/104 |
| 2006/0228873 A1* | 10/2006 | Liu | G01Q 70/16 438/496 |
| 2008/0011066 A1* | 1/2008 | Suh | B82Y 35/00 73/105 |

(Continued)

FOREIGN PATENT DOCUMENTS

EP    2458391 A1    5/2012

OTHER PUBLICATIONS

International Search Report of PCT/US2018/035119, dated Sep. 21, 2018.

*Primary Examiner* — David E Smith
(74) *Attorney, Agent, or Firm* — W&K IP

(57) ABSTRACT

Articles and methods related to scanning probe microscopy probes are generally provided. A scanning probe microscopy probe may comprise a chip, a mechanical resonator attached to the chip, a tip attached to the mechanical resonator, and a handle attached to the chip. The handle may have a length of at least 5 mm and an average thickness of less than or equal to 500 microns. The probe may further comprise an insulating coating covering both the chip and the handle.

17 Claims, 20 Drawing Sheets

(56) References Cited

U.S. PATENT DOCUMENTS

2009/0265819 A1* 10/2009 Watanabe .............. G01Q 20/04
850/21
2010/0205698 A1* 8/2010 Faucher ................ G01Q 20/04
850/40
2011/0265227 A1* 10/2011 Shih ....................... B82Y 35/00
850/33

* cited by examiner

US 11,499,990 B2

ATOMIC FORCE MICROSCOPE PROBES AND METHODS OF MANUFACTURING PROBES

RELATED APPLICATIONS

This application is a continuation of international patent application PCT/US2018/035119 filed May 30, 2018, further claims priority under 35 U.S.C. § 119(e) to U.S. Provisional Application No. 62/603,454, filed May 30, 2017, and entitled "Atomic force microscope probes and methods of manufacturing probes", which is incorporated herein by reference in its entirety for all purposes.

FIELD

The present invention relates generally to scanning probe microscopy probes.

BACKGROUND

Scanning probe microscopy (SPM) probes may be used in combination with scanning probe microscopes to detect micro- and/or nano-scale features of samples. Some scanning probe microscopy probes may be incompatible with some environments under which operators wish to make measurements and/or may be difficult for operators to manipulate.

Accordingly, improved compositions and methods are needed.

SUMMARY

Scanning probe microscopy probes as well as related components and methods associated therewith are provided.

In some embodiments, a scanning probe microscopy probe comprises a chip, a mechanical resonator attached to the chip, a tip attached to the mechanical resonator, and a handle attached to the chip. The handle has a length of at least 5 mm and an average thickness of less than or equal to 500 microns.

In some embodiments, a scanning probe microscopy probe comprises a chip, a mechanical resonator attached to the chip, a tip attached to the mechanical resonator, a handle attached to the chip, and an insulating coating covering both the chip and the handle.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
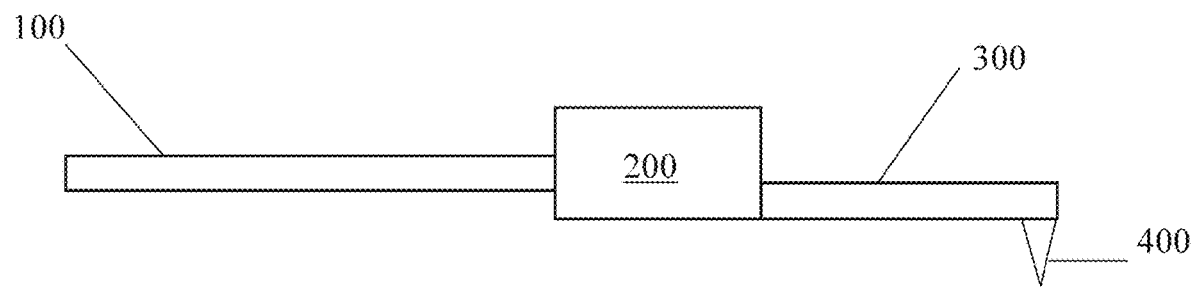
FIGS. 1A and 1B show scanning probe microscopy probes comprising handles, according to some embodiments.

Articles and methods related to scanning probe microscopy probes comprising handles are generally provided. In some embodiments, the handle has one or more features that enhance the compatibility of the scanning probe microscopy probe with an environment in which it is desirable to make a measurement, such as an environment in a sample holder. The handle may be both compatible with the environment in which it is desirable to make a measurement and configured to electrically connect a portion of the scanning probe microscopy probe (e.g., a tip, a portion of a chip) to an environment external to the environment in which it is desirable to make a measurement. Handles with this capability may allow operators to make electrical measurements in environments in which they otherwise could not, and/or may allow operators to make types of electrical measurements that they otherwise could not.

In some embodiments, a scanning probe microscopy probe comprises a handle that enhances the ease with which an operator may manipulate the scanning probe microscopy probe. Certain existing scanning probe microscopy probes are manipulated with the use of tweezers; however, scanning probe microscopy probes that may be manipulated easily by hand (e.g., without the use of tweezers or other instruments) may be desirable for certain operators.

Three features of handles that may promote compatibility of the scanning microscopy probe comprising the handle with particular sample environments and/or may make the scanning probe microscopy probe comprising the handle easier to manipulate include the thickness of the handle, its width, and the design of an insulating coating covering the handle. It should be appreciated that scanning microscopy probes with handles described herein may have one, two, or all of such features.

Handles that are relatively thin may be capable of passing through a barrier in a sample cell typically employed to isolate the sample cell from an external environment without compromising the ability of the barrier to isolate the sample cell from an external environment. For instance, handles that are relatively thin may be capable of passing between an O-ring and a groove with which the O-ring forms a seal without breaking the seal. Such handles may be able to pass from an environment interior to the O-ring and sealed from an environment exterior to the O-ring to the environment exterior to the O-ring.

Handles that are relatively long may be capable of connecting scanning microscopy probes to locations an appreciable distance from the scanning microscopy probes. This may be advantageous when, for instance, a desirable connection is made via the handle. As an example, handles that are relatively long and are configured to electrically connect one or more portions of the probe to an electrical connection external to the probe may be beneficial. Such handles may be capable of electrically connecting one or more portions of the probe to, e.g., an electrical controller that is located distal to these portion(s) of the probe. A handle with a relatively long handle configured to make an electrical connection from one of its ends to another may be capable of electrically connecting a portion of the scanning microscopy probe configured to be positioned inside a sample cell, in which it would be challenging to place an electrical controller, with an electrical controller external to the sample cell. This may allow the scanning microscopy probe to perform measurements that would otherwise be challenging or impossible to perform. If the handle is relatively thin, relatively long, and configured to make an electrical connection from one of its ends to another, the handle may allow the scanning microscopy probe to perform measurements in a sample environment that would otherwise be challenging or impossible to perform the measurements in.

Scanning microscopy probes comprising handles that are relatively long may also be relatively easy to manipulate in comparison to scanning probe microscopy probes lacking handles, or including shorter handles. For instance, handles that are long enough to be easily grasped by fingers may be easier to manipulate than handles that are too short to be easily grasped by fingers.

Scanning probe microscopy probes that comprise insulating coatings with advantageous designs may be more insulating and/or less permeable to a variety of species than insulating coatings with less advantageous designs. For instance, insulating coatings that cover more than one portion of the scanning probe microscopy probe (e.g., that cover both a chip and a handle therein) may include fewer boundaries through which undesirable species may flow.

Figure 1B:
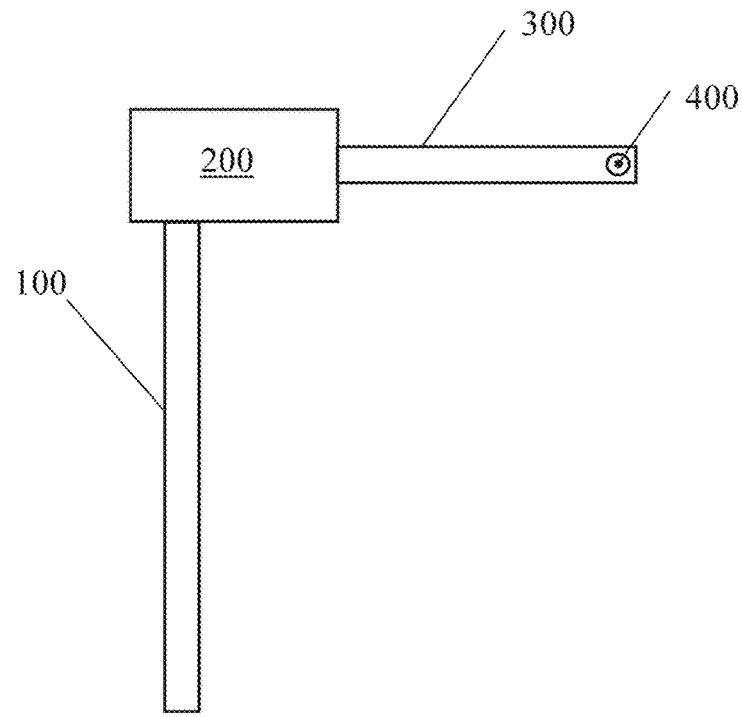

As described herein, in some embodiments, a scanning probe microscopy probe comprises a handle, a chip, a mechanical resonator, and a tip. FIG. 1A shows one non-limiting example of a scanning probe microscopy probe comprising a handle 100, a chip 200, a mechanical resonator 300, and a tip 400. The handle may have a variety of suitable designs. In some embodiments, like that shown in FIG. 1A, the handle may extend away from the chip in a relatively straight direction. Such handles may extend backwards from the chip (i.e., in a direction from the chip opposite the direction the mechanical resonator extends from the chip), as is shown in FIG. 1A, or may extend from the chip at a variety of angles. FIG. 1B shows one non-limiting example of a handle extending from a chip at an angle other than that shown in FIG. 1A. In FIG. 1B, the handle extends sideways from the chip (i.e., in a direction from the chip other than a direction the mechanical resonator extends from the chip, and other than a direction opposite the direction the mechanical resonator extends from the chip; one example of a direction sideways from the chip is a direction 90° from the direction the mechanical resonator extends from the chip). It should also be understood that the handle may extend from any surface of the chip, such as a top surface, a bottom surface, a side surface, a surface opposite the surface from which the mechanical resonator extends, a surface from which the mechanical resonator extends.

In some embodiments, a scanning probe microscopy probe comprises a handle that does not extend away from the chip in a relatively straight direction. For example, the handle may curve, may include one or more portions separated by bends, and the like.

Figure 2:
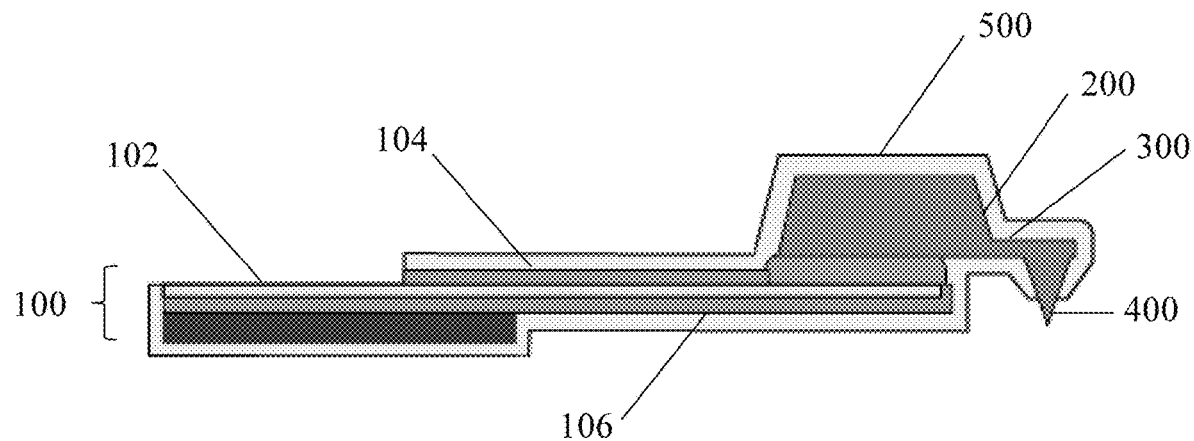
FIGS. 2 and 3 show scanning probe microscopy probes comprising a handle and an insulating coating, according to some embodiments.

As also described herein, a scanning probe microscopy probe may comprise an insulating coating covering one or more portions of the scanning probe microscopy probe. In some embodiments, the scanning probe microscopy probe comprises an insulating coating covering both the chip and the handle. The insulating coating may also cover other portions of the scanning probe microscopy probe, such as the mechanical resonator (and/or one or more portions thereof) and/or one or more portions of the tip. FIG. 2 shows one non-limiting embodiment of a scanning probe microscopy probe comprising an insulating coating. In FIG. 2, the scanning microscopy probe comprises a handle 100, a chip 200, a mechanical resonator 300, a tip 400, and an insulating coating 500. As show illustratively in FIG. 2, the insulating coating covers the handle, the chip, the mechanical resonator, and the tip. In some embodiments, a scanning probe microscopy probe may comprise an insulating coating covering fewer portions of the scanning probe microscopy probe than those shown in FIG. 2. For instance, the insulating coating may cover only the handle and the chip, may not cover the tip or any portions thereof, may not cover the entirety of the mechanical resonator, or may cover portions of the mechanical resonator but not all of the mechanical resonator. It should also be understood that FIG. 2 is merely exemplary, and that the insulating coating, handle, chip, mechanical resonator, and tip shown therein may have different designs. For example, the handle may include fewer layers or more layers than those shown in FIG. 2.

In some embodiments, a scanning probe microscopy probe comprises a handle that is configured to electrically connect a portion of a chip to a portion of the handle distal to the chip. The handle may comprise one or more electrically conducting materials that extend from the chip to the portion distal to the chip. The electrically conducting material may electrically connect the chip to a portion of the handle distal to the chip. Referring to FIG. 2 again, in FIG. 2 handle 100 comprises an electrically conducting material 102 that extends along its length. The electrically conducting material is encapsulated along part of its length by the insulating coating 500 and by layers 104 and 106 comprising insulating materials. The electrically conducting material is both in contact with the chip and partially exposed along a portion of the handle distal to the chip. The portion of the electrically conducting material that is partially exposed may be configured to make an electrical connection, such as with an external electrical controller (not shown). It should be understood that handles configured to electrically connect a portion of a chip to a portion of the handle distal to the chip may have designs other than that shown in FIG. 2. For example, a different relative amount of the electrically conducting material may be exposed, the portion of the electrically conducting material that is exposed may be positioned in a different location than the portion shown in FIG. 2, the electrically conducting material may be insulated by either a layer comprising an electrically insulating material or a coating (e.g., not by both), the electrically conducting material may be in electrical connection with a portion of the chip other than that shown in FIG. 2, and the like.

In some embodiments, a handle may be configured to electrically connect one or more electrodes disposed on a chip to a portion of the handle distal to the chip. The handle may be configured to connect two, three, four, five, six, or more electrodes disposed on a chip to a portion of the handle distal to the chip. The electrodes may, in some embodiments, be configured to perform piezoresistive measurements. The electrodes may be configured to perform other types of measurements.

In some embodiments, a handle may be configured to electrically connect an electrode disposed on a tip to a portion of the handle distal to the chip. The handle may be electrically connected to the chip, and the chip may electrically connect the handle to the electrode disposed on the tip. In some embodiments, the electrode disposed on the tip may be a working electrode.

In some embodiments, a handle may comprise one or more electrodes. The electrodes positioned in the handle may include reference electrodes and/or counter electrodes. In some embodiments, a handle may comprise one or more electrodes positioned proximate the chip, and may electrically connect these electrodes to a portion of the handle distal to the chip (e.g., by an electrically conducting material positioned therein).

As described above, in some embodiments a handle includes more than one layer. The handle may include one or more layers comprising electrically conducting materials and one or more layers comprising electrically insulating materials. The layer(s) comprising the electrically conducting materials may be electrically insulated from an environment external to the handle by the layer(s) comprising the electrically insulating materials. The layers comprising the electrically insulating material may, in some embodiments, provide one or more further types of insulation (e.g., insulation from one or more species external to the handle). These layers may be positioned external to the layer(s) comprising the electrically conducting material (e.g., they may be disposed on and/or around the layer(s) of electrically conducting material and/or may be outer layers of the handle).

Handles may include layers comprising electrically insulating materials that are polymers and/or electrically insulating materials that are inorganic materials. Non-limiting examples of suitable polymers include polyesters, polyethylene, polyvinyl chloride, polypropylene, polyacrylics, polycellulosics, polycarbonates, polyxylylene, polystyrenes, polyamides, polyimides, SU-8, polyacetonitriles, polymethylmethacrylate, cellulose acetate butyrate, polycarbonate, glycol modified polyethylene terephthalate, and styrene butadiene copolymer. The polymer may be cross-linked, uncross-linked, and/or may be a polymer formed by a chemical vapor deposition process. Non-limiting examples of suitable inorganic materials include silicon oxide, silicon nitride, titanium oxide, aluminum oxide, and diamond.

In some embodiments, the electrically insulating material may be substantially impermeable to one or more fluids. For example, the electrically insulating material may be substantially impermeable to water, to one or more fluids comprising water (e.g., comprising water and a salt), and/or to one or more organic solvents (e.g., tetraglyme). In some embodiments, the electrically insulating material may be substantially impermeable to one or more common battery electrolytes, such as fluids comprising one or more organic solvents (e.g., ethylene carbonate, dimethylene carbonate, propylene carbonate, ethyl methyl carbonate, diethylene carbonate, fluoroethylene carbonate, vinylene carbonate, 1,3-propane sultone, 2-propynyl methanesulfonate, cyclohexylbenzene t-amyl benzene, adiponitrile) and/or one or more salts (e.g., $LiPF_6$).

Non-limiting examples of suitable electrically conducting materials include metals and metal alloys, such as copper, tin, lead, lead free solder (e.g., tin/copper alloy solder), nickel, gold, electroless nickel immersion gold, silver, chromium, titanium, and platinum.

In some embodiments, a handle may comprise one or more layers that do not extend across the full length of the handle (e.g., one or more layers that extend partially along the length of the handle). For instance, the handle may comprise a layer comprising an electrically conducting material, and the layer comprising the electrically conducting material may extend from a portion of the handle where it is in electrical connection with a chip to a portion of the handle in which it is configured to make an electrical connection. This layer typically, but not always, comprises copper. The handle may further comprise other portions, such as one or more portions that enhance the ease with which the scanning probe microscopy probe may be manipulated (e.g., an electrically insulating portion or a stiffener, as described in more detail below).

As another example, in some embodiments, a handle may include a layer comprising an electrically insulating material disposed on a layer comprising an electrically conducting material configured to make an electrical connection, and the layer comprising the electrically insulating material may not extend across a portion of the layer comprising the electrically conducting material.

As a third example, in some embodiments one or more layers comprising electrically conducting materials that do not extend across the full length of the handle. The layer(s) comprising the electrically conducting materials that do not extend across the full length of the handle may be layer(s)

configured to make an electrical connection, and/or may be layer(s) through which an electrical connection may be made. In some embodiments, one or more layers comprising an electrically conducting material may not extend across the full length of the handle, and may be disposed on a layer comprising an electrically conducting material that does extend across the full length of the handle. The layer comprising the electrically conducting material extending across the full length of the handle may be in direct electrical connection with a chip. Layers comprising an electrically conducting material that does not extend across the full length of the handle may comprise electrically conducting material such as, for example, tin, lead, lead free solder (e.g., tin/copper alloy solder), nickel, gold, electroless nickel immersion gold, silver, chromium, and/or platinum. In some embodiments, a handle comprises two or more layers comprising electrically conducting materials that do not extend across the full length of the handle. Non-limiting examples of such combinations of layers include a nickel layer disposed on a gold layer, a copper layer disposed on a gold layer, a copper layer disposed on a chromium layer disposed on a gold layer, and a copper layer disposed on a titanium layer disposed on a gold layer.

In some embodiments, a handle may comprise one or more layers that do not extend across the full width of the handle (e.g., one or more layers that extend partially along the width of the handle). These layers may extend along the full length of the handle, or may not extend along the full length of the handle. For example, a handle may comprise a layer comprising an electrically conducting material that extends across the full length of the handle but not across the full width of the handle. The layer comprising the electrically conducting material may be insulated on one or more (or all sides) by an insulating material (e.g., in the form of a layer comprising an insulating material, in the form of a coating comprising an insulating material).

As described above, in some embodiments, a scanning probe microscopy probe comprises an insulating coating. The insulating coating may cover a chip, a handle, and/or one or more other components of the scanning probe microscopy probe. The insulating coating may comprise a polymer (e.g., a polymer that is an insulating material as described above) and/or an inorganic material (e.g., an inorganic material that is an insulating material as described above). The insulating coating may also be impermeable to one or more fluids (e.g., one or more fluids to which an insulating material is impermeable, as described above). In some embodiments, the insulating coating may be configured to allow a relatively low amount of leakage current to pass therethrough. The leakage current through the insulating coating may be less than or equal to 100 nA, less than or equal to 10 nA, less than or equal to 1 nA, less than or equal to 100 pA, less than or equal to 10 pA, or less than or equal to 1 pA. The leakage current through the insulating coating may be greater than or equal to 0.1 pA, greater than or equal to 1 pA, greater than or equal to 10 pA, greater than or equal to 100 pA, greater than or equal to 1 nA, or greater than or equal to 10 nA. Combinations of the above-referenced ranges are also possible (e.g., less than or equal to 100 nA and greater than or equal to 0.1 pA, or less than or equal to 10 nA and greater than or equal to 0.1 pA). Other ranges are also possible. The leakage current may be measured by cyclic voltammetry.

In some embodiments, an insulating coating further comprises one or more additional components. For example, the insulating coating may comprise a stiffener. Without wishing to be bound by any particular theory, the stiffener may improve the manipulability of the handle. The stiffener may be positioned uniformly throughout the handle, may be positioned at higher relative amounts in some portions of the handle than others (e.g., in a gradient), and/or may be positioned in one or more portions of the handle and absent from other portions of the handle. When the stiffener is positioned in one or more portions of the handle and absent from other portions of the handle, the portions comprising the stiffener may be configured to be grasped by the operator. These portions may be thicker and/or easier to grasp or manipulate than other portions of the handle. The stiffener, if present, may comprise a variety of suitable materials, non-limiting examples of which include polyimide and fiberglass.

Figure 3:
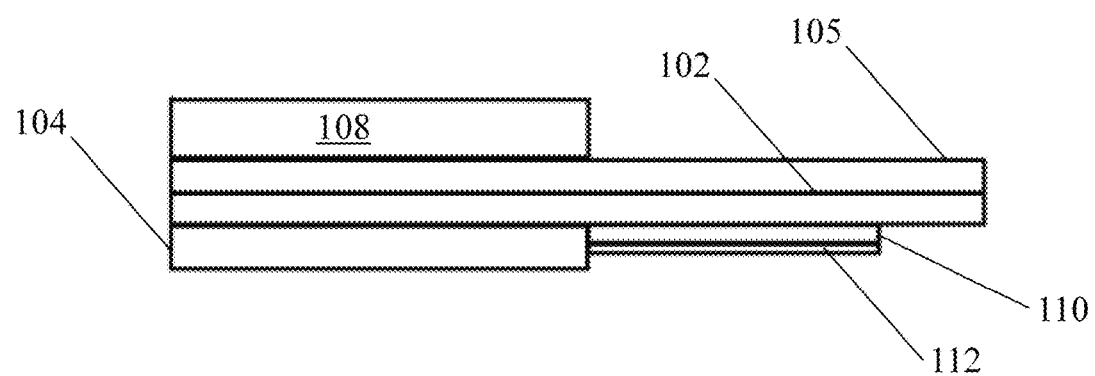

FIG. 3 shows one non-limiting embodiment of an insulating coating comprising a stiffener. A stiffener 108 is positioned on a layer 104 comprising an electrically insulating material (e.g., a layer comprising polyimide), which is positioned on a layer 102 comprising an electrically conducting material (e.g., copper). As can also be seen in FIG. 3, layer 104 comprising the electrically insulating material does not cover the entirety of layer 102 comprising the electrically conductive material. Instead, one portion of layer 102 comprising the electrically conducting material is configured to make an electrical connection. This portion of the layer comprising the electrically conducting material is covered by other layers comprising electrically conducting materials (e.g., a nickel layer 110 positioned on an immersion gold layer 112 in FIG. 3). FIG. 3 also shows a second layer 105 comprising an electrically insulating material positioned on a side of layer 102 opposite layer 104.

As also described above, some handles described herein are configured to make an electrical connection to an electrical controller. The electrical connection may, in some embodiments, be a zero insertion force electrical connection. The electrical controller may be positioned in a variety of suitable locations. In some embodiments, the electrical controller is positioned on a scanning probe microscope. For example, the scanning probe microscopy probe may comprise one or more portions other than the handle that are configured to be positioned in one part of a scanning probe microscope (e.g., a chip, mechanical resonator, and/or tip in a chip holder and/or sample cell) and may comprise a handle configured to make an electrical connection with an electrical controller also positioned on the scanning probe microscope (e.g., in a position external to a chip holder and/or a sample cell).

Handles described herein may have a variety of beneficial physical properties. Some handles may have relatively low thicknesses. The thickness of the handle may be, for example, less than or equal to 500 microns, less than or equal to 400 microns, less than or equal to 300 microns, less than or equal to 250 microns, less than or equal to 200 microns, less than or equal to 150 microns, less than or equal to 100 microns, less than or equal to 75 microns, or less than or equal to 50 microns. The thickness of the handle may be greater than or equal to 20 microns, greater than or equal to 50 microns, greater than or equal to 75 microns, greater than or equal to 100 microns, greater than or equal to 200 microns, greater than or equal to 300 microns, or greater than or equal to 400 microns. Combinations of the above-referenced ranges are also possible (e.g., less than or equal to 500 microns and greater than or equal to 20 microns, less than or equal to 100 microns and greater than or equal to 20 microns, or less than or equal to 75 microns and greater than or equal to 50 microns). Other ranges are also possible.

In some embodiments, a handle and a chip together have a relatively low thickness. The thickness of the handle and the chip together may be less than or equal to 2000 microns, less than or equal to 1500 microns, less than or equal to 1000 microns, less than or equal to 750 microns, less than or equal to 600 microns, less than or equal to 500 microns, or less than or equal to 200 microns. The thickness of the handle and the chip together may be greater than or equal to 100 microns, greater than or equal to 200 microns, greater than or equal to 500 microns, greater than or equal to 600 microns, greater than or equal to 750 microns, greater than or equal to 1000 microns, or greater than or equal to 1500 microns. Combinations of the above-referenced ranges are also possible (e.g., less than or equal to 2000 microns and greater than or equal to 100 microns, or less than or equal to 600 microns and greater than or equal to 100 microns). Other ranges are also possible.

In some embodiments, a handle has a relatively long length. The length of the handle may be greater than or equal to 2 mm, greater than or equal to 5 mm, greater than or equal to 10 mm, greater than or equal to 20 mm, greater than or equal to 50 mm, greater than or equal to 1 cm, greater than or equal to 2 cm, greater than or equal to 5 cm, greater than or equal to 10 cm, or greater than or equal to 20 cm. The length of the handle may be less than or equal to 50 cm, less than or equal to 20 cm, less than or equal to 10 cm, less than or equal to 5 cm, less than or equal to 2 cm, less than or equal to 1 cm, less than or equal to 50 mm, less than or equal to 20 mm, less than or equal to 10 mm, or less than or equal to 5 mm. Combinations of the above-referenced ranges are also possible (e.g., greater than or equal to 2 mm and less than or equal to 50 cm, or greater than or equal to 5 mm and less than or equal to 50 cm). Other ranges are also possible.

Handles described herein may have a range of suitable stiffnesses. In some embodiments, the handle has a stiffness of approximately 10 mN/m. The stiffness of the handle may be less than or equal to 1 N/m, less than or equal to 500 mN/m, less than or equal to 200 mN/m, less than or equal to 100 mN/m, less than or equal to 50 mN/m, less than or equal to 20 mN/m, less than or equal to 10 mN/m, less than or equal to 5 mN/m, less than or equal to 2 mN/m, less than or equal to 1 mN/m, less than or equal to 500 μN/m, less than or equal to 200 N/m, less than or equal to 100 μN/m, less than or equal to 50 μN/m, less than or equal to 20 μN/m, less than or equal to 10 μN/m, less than or equal to 5 jμN/m, or less than or equal to 2 μN/m. The stiffness of the handle may be greater than or equal to 1 μN/m, greater than or equal to 2 μN/m, greater than or equal to 5 μN/m, greater than or equal to 10 μN/m, greater than or equal to 20 μN/m, greater than or equal to 50 μN/m, greater than or equal to 100 μN/m, greater than or equal to 200 μN/m, greater than or equal to 500 μN/m, greater than or equal to 1 mN/m, greater than or equal to 2 mN/m, greater than or equal to 5 mN/m, greater than or equal to 10 mN/m, greater than or equal to 20 mN/m, greater than or equal to 50 mN/m, greater than or equal to 100 mN/m, greater than or equal to 200 mN/m, or greater than or equal to 500 mN/m. Combinations of the above-referenced ranges are also possible (e.g., less than or equal to 1 N/m and greater than or equal to 1 μN/m, less than or equal to 50 mN/m and greater than or equal to 1 mN/m, or less than or equal to 20 mN/m and greater than or equal to 5 mN/m). Other ranges are also possible. The stiffness of the handle may be determined by determining the stiffness of the material forming the insulating coating, which is often provided by the manufacturer for commercially-available materials, and the geometry of the insulating coating.

Handles described herein may have a variety of suitable radii of curvature. In some embodiments, the handle has a radius of curvature of greater than or equal to 0.1 mm, greater than or equal to 0.2 mm, greater than or equal to 0.4 mm, greater than or equal to 0.6 mm, greater than or equal to 0.8 mm, greater than or equal to 1 mm, greater than or equal to 1.5 mm, greater than or equal to 2 mm, greater than or equal to 4 mm, greater than or equal to 6 mm, or greater than or equal to 8 mm. The handle may have a radius of curvature of less than or equal to 10 mm, less than or equal to 8 mm, less than or equal to 6 mm, less than or equal to 4 mm, less than or equal to 2 mm, less than or equal to 1.5 mm, less than or equal to 1 mm, less than or equal to 0.8 mm, less than or equal to 0.6 mm, less than or equal to 0.4 mm, or less than or equal to 0.2 mm). Combinations of the above-referenced ranges are also possible (e.g., greater than or equal to 0.1 mm and less than or equal to 10 mm, or greater than or equal to 0.4 mm and less than or equal to 2 mm). Other ranges are also possible. For commercially available materials, the radius of curvature is often provided by the manufacturer.

In some embodiments, the handle has a relatively low parasitic capacitance. The parasitic capacitance of the handle may be less than or equal to 10 nF, less than or equal to 5 nF, less than or equal to 2 nF, less than or equal to 1 nF, less than or equal to 500 pF, less than or equal to 200 pF, less than or equal to 100 pF, less than or equal to 75 pF, less than or equal to 50 pF, less than or equal to 20 pF, less than or equal to 10 pF, less than or equal to 5 pF, less than or equal to 2 pF, less than or equal to 1 pF, less than or equal to 500 fF, of less than or equal to 200 fF. The parasitic capacitance of the handle may be greater than or equal to 100 fF, greater than or equal to 200 fF, greater than or equal to 500 fF, greater than or equal to 1 pF, greater than or equal to 2 pF, greater than or equal to 5 pF, greater than or equal to 10 pF, greater than or equal to 20 pF, greater than or equal to 50 pF, greater than or equal to 75 pF, greater than or equal to 100 pF, greater than or equal to 200 pF, greater than or equal to 500 pF, greater than or equal to 1 nF, greater than or equal to 2 nF, or greater than or equal to 5 nF. Combinations of the above-referenced ranges are also possible (e.g., less than or equal to 10 nF and greater than or equal to 100 fF, less than or equal to 1 nF and greater than or equal to 20 pF, or less than or equal to 75 pF and greater than or equal to 20 pF). Other ranges are also possible. The parasitic capacitance may be determined by cyclic voltammetry. Briefly, (1) cyclic voltammetry curves may be recorded by using a potentiostat; (2) the exposed tip area may be estimated from the magnitude of the measured current; and (3) the current measured while the voltage is increased may be compared to the current measured while the voltage is decreased to determine the parasitic capacitance.

In some embodiments, a scanning probe microscopy probe may include a handle comprising a commercially available material that comprises an insulated electrical conductor configured to make one or more electrical connections. For example, the handle may comprise a printed circuit board.

In some embodiments, a scanning probe microscopy probe may comprise one or more components described in U.S. Provisional Patent Application No. 62/597,642, filed Dec. 12, 2017, and entitled "Encasements for Sensors", which is incorporated herein by reference in its entirety for all purposes.

As described above, certain embodiments are directed to scanning probe microscopy probes comprising chips. When present the chip may have any suitable dimension. The chip may have a width and/or a length of greater than or equal to 0.1 mm, greater than or equal to 0.2 mm, greater than or equal to 0.5 mm, greater than or equal to 0.75 mm, greater than or equal to 1 mm, greater than or equal to 2 mm, greater than or equal to 5 mm, or greater than or equal to 7.5 mm. The chip may have a width and/or a length of less than or equal to 10 mm, less than or equal to 7.5 mm, less than or equal to 5 mm, less than or equal to 2 mm, less than or equal to 1 mm, less than or equal to 0.75 mm, less than or equal to 0.5 mm, or less than or equal to 0.2 mm. Combinations of the above-referenced ranges are also possible (e.g., greater than or equal to 0.1 mm and less than or equal to 10 mm, or greater than or equal to 0.5 mm and less than or equal to 10 mm). In some embodiments, a chip may be a rectangle with side lengths 1.6 mm and 3.4 mm.

When present, the chip may comprise any suitable material(s). The chip may comprise one or more of a glass, a plastic, an insulating material, a semiconducting material, a piezoelectric material, a piezoresistive material, a conductive material, and a metal. Non-limiting examples of suitable glasses include amorphous silicon nitride, amorphous silicon dioxide, amorphous aluminum oxide, and amorphous zinc oxide. Non-limiting examples of suitable plastics include polyesters, polyethylene, polyvinyl chloride, polypropylene, polyacrylics, polycellulosics, polycarbonates, polystyrenes, polyamides, polyacetonitriles, polymethlamethacrylate, polyxylylenes, cellulose acetate butyrate, glycol modified polyethylene terphthalate, and styrene butadiene copolymer. Non-limiting examples of suitable insulating materials include silicon nitride, silicon dioxide, diamond, and aluminum oxide. Non-limiting examples of suitable semiconducting materials include silicon, silicon doped with boron, silicon doped with phosphorus, silicon doped with arsenic, silicon doped with gallium, gallium arsenide, doped diamond, amorphous carbon, zinc oxide, and indium gallium zinc oxide. Non-limiting examples of suitable piezoelectric materials include lead zirconate titanate (PZT), quartz, and lead titanate. Non-limiting examples of suitable piezoresistive materials include silicon, silicon doped with boron, silicon doped with phosphorus, silicon doped with arsenic, and silicon doped with gallium. Non-limiting examples of suitable conductive materials include amorphous carbon, indium tin oxide (ITO), aluminum zinc oxide (AZO), and indium cadmium oxide. Non-limiting examples of suitable metals include gold, silver, platinum, aluminum, titanium, chromium, titanium nitride, and copper.

As described above, certain embodiments are directed to scanning probe microscopy probes comprising mechanical resonators. In some embodiments, the mechanical resonator may be a cantilever.

The mechanical resonators described herein may have any suitable quality factor. In some embodiments, the quality factor of the mechanical resonator is greater than or equal to 2, greater than or equal to 5, greater than or equal to 10, greater than or equal to 20, greater than or equal to 50, greater than or equal to 100, greater than or equal to 200, greater than or equal to 500, or greater than equal to 1,000, greater than or equal to 2,000, greater than or equal to 5,000, greater than or equal to 10,000, or greater than or equal to 20,000. In some embodiments, the quality factor of the mechanical resonator is less than or equal to 50,000, less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, less than or equal to 10, or less than or equal to 5. Combinations of the above-referenced ranges are also possible (e.g., greater than or equal to 2 and less than or equal to 500,000, or greater than or equal to 10 and less than or equal to 2,000). Other ranges are also possible. As used herein, the quality factor is a dimensionless parameter expressing the ratio of the stored energy of an oscillator to the energy dissipation of the oscillator. The quality factor may be measured by performing the following procedure: (1) reflecting a laser from the back side of the mechanical resonator; (2) determining the deflection of the mechanical resonator based on the reflected laser; (3) generating a power spectrum from the thermal motion in the mechanical resonator as determined by the deflection of the mechanical resonator; and (4) fitting a simple harmonic oscillator model to the resonance peak in the generated power spectrum. The quality factor may be determined from the resonance peak.

When a sensor comprises a mechanical resonator, the mechanical resonator may have any suitable resonant frequency. In some embodiments, the resonant frequency of the mechanical resonator is greater than or equal to 0.1 kHz, greater than or equal to 0.2 kHz, greater than or equal to 0.5 kHz, greater than or equal to 1 kHz, greater than or equal to 2 kHz, greater than or equal to 5 kHz, greater than or equal to 10 kHz, greater than or equal to 20 kHz, greater than or equal to 50 kHz, greater than or equal to 100 kHz, greater than or equal to 200 kHz, greater than or equal to 500 kHz, greater than or equal to 1,000 kHz, greater than or equal to 2,000 kHz, greater than or equal to 5,000 kHz, greater than or equal to 10,000 kHz, greater than or equal to 20,000 kHz, or greater than or equal to 50,000 kHz. In some embodiments, the resonant frequency of the mechanical resonator is less than or equal to 100,000 kHz, less than or equal to 50,000 kHz, less than or equal to 20,000 kHz, less than or equal to 10,000 kHz, less than or equal to 5,000 kHz, less than or equal to 2,000 kHz, less than or equal to 1,000 kHz, less than or equal to 500 kHz, less than or equal to 200 kHz, less than or equal to 100 kHz, less than or equal to 50 kHz, less than or equal to 20 kHz, less than or equal to 10 kHz, less than or equal to 5 kHz, less than or equal to 2 kHz, less than or equal to 1 kHz, less than or equal to 0.5 kHz, or less than or equal to 0.2 kHz. Combinations of the above-referenced ranges are also possible (e.g., greater than or equal to 0.1 kHz and less than or equal to 100,000 kHz, or greater than or equal to 10 kHz and less than or equal to 10,000 kHz). Other ranges are also possible.

For resonant frequencies less than 1 MHz, the resonant frequency may be measured by performing the following procedure: (1) reflecting a laser from the back side of the mechanical resonator; (2) determining the deflection of the mechanical resonator based on the reflected laser; (3) generating a power spectrum from the thermal motion in the mechanical resonator as determined by the deflection of the mechanical resonator; and (4) fitting a simple harmonic oscillator model to the resonance peak in the generated power spectrum. This procedure is also described in J. L. Hutter and J. Bechhoefer, "Calibration of atomic-force microscope tips." *Rev. Sci. Instrum.* 64, 1868-1873 (1993), which is incorporated herein by reference. The resonant frequency may be determined from the resonance peak. For resonant frequencies between 0.1 kHz and 10,000 kHz, the resonant frequency may be measured by performing the following procedure: (1) reflecting a laser from the back side of the mechanical resonator; (2) determining the deflection of the mechanical resonator based on the reflected laser; (3) exciting mechanical motion of the resonator either through mechanically moving the chip (shaking) or by electrically exciting the resonator through a piezo electric effect; (4) sweeping the excitation frequency; and (5) identifying the resonance through its enhancement of the amplitude of oscillation. For resonant frequencies greater than 100 kHz, the resonant frequency may be measure by (1) measuring the electrical impedance of a circuit that contains the resonator as one of the elements; (2) exciting mechanical motion of the resonator by electrically exciting the resonator through a piezo electric effect; (3) sweeping the excitation frequency; and (5) identifying the resonance through the modulation of the electrical impedance of the circuit near the resonance.

When a scanning probe microscopy probe comprises a mechanical resonator, the mechanical resonator may have any suitable stiffness. In some embodiments, the stiffness of the mechanical resonator is greater than or equal to 0.01 N/m, greater than or equal to 0.02 N/m, greater than or equal to 0.05 N/m, greater than or equal to 0.1 N/m, greater than or equal to 0.2 N/m, greater than or equal to 0.5 N/m, greater than or equal to 1 N/m, greater than or equal to 2 N/m, greater than or equal to 5 N/m, greater than or equal to 10 N/m, greater than or equal to 20 N/m, greater than or equal to 50 N/m, greater than or equal to 100 N/m, greater than or equal to 200 N/m, or greater than or equal to 500 N/m. The stiffness of the mechanical resonator may be less than or equal to 1,000 N/m, less than or equal to 500 N/m, less than or equal to 200 N/m, less than or equal to 100 N/m, less than or equal to 50 N/m, less than or equal to 20 N/m, less than or equal to 10 N/m, less than or equal to 5 N/m, less than or equal to 2 N/m, less than or equal to 1 N/m, less than or equal to 0.5 N/m, less than or equal to 0.2 N/m, less than or equal to 0.1 N/m, less than or equal to 0.05 N/m, or less than or equal to 0.02 N/m. Combinations of the above-referenced ranges are also possible (e.g., greater than or equal to 0.01 N/m and less than or equal to 1,000 N/m, or greater than or equal to 0.5 N/m and less than or equal to 100 N/m). Other ranges are also possible.

For resonator stiffness less than 100 N/m, the stiffness may be measured by performing the following procedure: (1) reflecting a laser from the back side of the mechanical resonator; (2) determining the deflection of the mechanical resonator based on the reflected laser and scaling for displacement in units of length; (3) generating a power spectrum from the thermal motion in the mechanical resonator as determined by the deflection of the mechanical resonator; (4) fitting a simple harmonic oscillator model to the resonance peak in the generated power spectrum; and (5) the stiffness may be determined from the area under the curve fitting the resonance peak, calculating the scalar of the simple harmonic oscillator model and calculating stiffness from the equipartition theorem, or the Sader method. This procedure is also described in J. L. Hutter and J. Bechhoefer, "Calibration of atomic-force microscope tips." *Rev. Sci. Instrum.* 64, 1868-1873 (1993), which is incorporated herein by reference. Also, when the mechanical resonator comprises a cantilever, the preferred method to calculate stiffness is the Sader method. In the Sader method, the dimensions of the mechanical resonator are measured using microscopy, and the resonance frequency and the quality factor of the mechanical resonator are determined from the thermal noise spectrum. For resonator stiffness greater than 0.01 N/m, the stiffness may be measured by performing the following procedure: (1) A calibration spring is pressed against the resonator while recording the reference spring deflection and total distance moved toward the resonator; (2) the force applied to the resonator is the deflection of the reference spring times its spring constant; (3) the deflection of the resonator is the difference between the total distance moved toward the resonator and the reference spring deflection; and (4) the resonator spring constant is the force applied to the resonator divided by the displacement of the resonator.

When present, the mechanical resonator may have any suitable dimensions. The thickness of the mechanical resonator may be greater than or equal to 10 nm, greater than or equal to 20 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns, greater than or equal to 10 microns, greater than or equal to 20 microns, or greater than or equal to 50 microns. The thickness of the mechanical resonator may be less than or equal to 100 microns, less than or equal to 50 microns, less than or equal to 20 microns, less than or equal to 10 microns, less than or equal to 5 microns, less than or equal to 2 microns, less than or equal to 1 micron, less than or equal to 500 nm, less than or equal to 200 nm, less than or equal to 100 nm, less than or equal to 50 nm, or less than or equal to 20 nm. Combinations of the above-referenced ranges are also possible (e.g., greater than or equal to 10 nm and less than or equal to 100 microns, greater than or equal to 10 nm and less than or equal to 20 microns, or greater than or equal to 100 nm and less than or equal to 20 microns). Other ranges are also possible. The thickness of the mechanical resonator may be determined by microscopy. As used herein, the thickness of the mechanical resonator is the length of the longest line that may be drawn from a top surface of the mechanical resonator to an opposing bottom surface of the mechanical resonator that is perpendicular to the top surface and to the opposing bottom surface.

In some embodiments, a scanning probe microscopy probe may comprise a mechanical resonator with a length of greater than or equal to 10 nm, greater than or equal to 20 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, greater than or equal to 200 microns, or greater than or equal to 500 microns. The length of the mechanical resonator may be less than or equal to 1 mm, less than or equal to 500 microns, less than or equal to 200 microns, less than or equal to 100 microns, less than or equal to 50 microns, less than or equal to 20 microns, less than or equal to 10 microns, less than or equal to 5 microns, less than or equal to 2 microns, less than or equal to 1 micron, less than or equal to 100 nm, less than or equal to 50 nm, or less than or equal to 20 nm. Combinations of the above-referenced ranges are also possible (e.g., greater than or equal to 10 nm and less than or equal to 1 mm, greater than or equal to 10 nm and less than or equal to 500 microns, or greater than or equal to 100 nm and less than or equal to 500 microns). Other ranges are also possible. The length of the mechanical resonator may be determined by microscopy. As used herein, the length of the mechanical resonator is the length of the longest line that may be drawn from the surface of the mechanical resonator attached to the chip to an opposing surface of the mechanical resonator. The position of the surface of the mechanical resonator adjacent the chip, as used herein, refers to the surface at which the displacement of the mechanical resonator is less than 0.1% of the displacement of the surface of the mechanical resonator closest to the front surface of the encasement when force is applied to the mechanical resonator to displace the surface of the mechanical resonator closest to the front surface of the encasement from equilibrium.

In some embodiments, a scanning probe microscopy probe may comprise a mechanical resonator with a width of greater than or equal to 10 nm, greater than or equal to 20 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, greater than or equal to 200 microns, or greater than or equal to 500 microns. The width of the mechanical resonator may be less than or equal to 500 microns, less than or equal to 200 microns, less than or equal to 100 microns, less than or equal to 50 microns, less than or equal to 20 microns, less than or equal to 10 microns, less than or equal to 5 microns, less than or equal to 2 microns, less than or equal to 1 micron, less than or equal to 500 nm, less than or equal to 200 nm, less than or equal to 100 nm, less than or equal to 50 nm, or less than or equal to 20 nm. Combinations of the above-referenced ranges are also possible (e.g., greater than or equal to 10 nm and less than or equal to 500 microns, greater than or equal to 10 nm and less than or equal to 200 microns, or greater than or equal to 100 nm and less than or equal to 200 microns). Other ranges are also possible. The width of the mechanical resonator may be determined by microscopy. As used herein, the width of the mechanical resonator is the length of the longest line that may be drawn from a first side surface of the mechanical resonator to an opposing side surface of the mechanical resonator that is perpendicular to the first side surface and the opposing side surface.

When present, the mechanical resonator may comprise any suitable material(s). The mechanical resonator may comprise one or more of a glass, a plastic, an insulating material, a semiconducting material, a piezoelectric material, a piezoresistive material, a conductive material, and a metal. Non-limiting examples of suitable glasses include amorphous silicon nitride, amorphous silicon dioxide, amorphous aluminum oxide, and amorphous zinc oxide. Non-limiting examples of suitable plastics include polyesters, polyethylene, polyvinyl chloride, polypropylene, polyacrylics, polycellulosics, polycarbonates, polystyrenes, polyamides, polyacetonitriles, polymethylmethacrylate, polyxylylenes, cellulose acetate butyrate, glycol modified polyethylene terphthalate, and styrene butadiene copolymer. Non-limiting examples of suitable insulating materials include silicon nitride, silicon dioxide, diamond, and aluminum oxide. Non-limiting examples of suitable semiconducting materials include silicon, silicon doped with boron, silicon doped with phosphorus, silicon doped with arsenic, silicon doped with gallium, gallium arsenide, doped diamond, amorphous carbon, zinc oxide, and indium gallium zinc oxide. Non-limiting examples of suitable piezoelectric materials include lead zirconate titanate (PZT), quartz, and lead titanate. Non-limiting examples of suitable piezoresistive materials include silicon, silicon doped with boron, silicon doped with phosphorus, silicon doped with arsenic, and silicon doped with gallium. Non-limiting examples of suitable conductive materials include amorphous carbon, indium tin oxide (ITO), aluminum zinc oxide (AZO), and indium cadmium oxide. Non-limiting examples of suitable metals include gold, silver, platinum, aluminum, titanium, chromium, titanium nitride, and copper.

As described above, certain embodiments are directed to scanning probe microscopy probes comprising tips. When present, the tip may have any suitable dimensions. In some embodiments, the tip has a height of greater than or equal to 100 nm, greater than or equal to 200 nm, greater than or equal to 500 nm, greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, or greater than or equal to 200 microns. In some embodiments, the tip has a height of less than or equal to 500 microns, less than or equal to 200 microns, less than or equal to 100 microns, less than or equal to 50 microns, less than or equal to 20 microns, less than or equal to 10 microns, less than or equal to 5 microns, less than or equal to 2 microns, less than or equal to 1 micron, less than or equal to 500 nm, or less than or equal to 200 nm. Combinations of the above-referenced ranges are also possible (e.g., greater than or equal to 100 nm and less than or equal to 500 microns). Other ranges are also possible. The height of the tip may be determined by microscopy. As used herein, the height of the tip is the length of the longest line that may be drawn perpendicular to the bottom surface of the mechanical resonator to the end of the probe.

When present, the probe may comprise any suitable material(s). The probe may comprise one or more of a glass, a plastic, an insulating material, a semiconducting material, a conductive material, a metal, and a carbonaceous material. Non-limiting examples of suitable glasses include amorphous silicon nitride, amorphous silicon dioxide, amorphous aluminum oxide, and amorphous zinc oxide. Non-limiting examples of suitable plastics include polyesters, polyethylene, polyvinyl chloride, polypropylene, polyacrylics, polycellulosics, polycarbonates, polystyrenes, polyamides, polyacetonitriles, polymethylmethacrylate, polyxylylenes, cellulose acetate butyrate, glycol modified polyethylene terphthalate, and styrene butadiene copolymer. Non-limiting examples of suitable insulating materials include silicon nitride, silicon dioxide, diamond, and aluminum oxide. Non-limiting examples of suitable semiconducting materials include silicon, silicon doped with boron, silicon doped with phosphorus, silicon doped with arsenic, silicon doped with gallium, gallium arsenide, doped diamond, amorphous carbon, zinc oxide, and indium gallium zinc oxide. Non-limiting examples of suitable conductive materials include amorphous carbon, indium tin oxide (ITO), aluminum zinc oxide (AZO), and indium cadmium oxide. Non-limiting examples of suitable metals include gold, silver, platinum, aluminum, titanium, chromium, titanium nitride, and copper. Non-limiting examples of suitable carbonaceous materials include multi-walled carbon nanotubes, single-walled carbon nanotubes, and amorphous carbon formed by electron beam deposition. In some embodiments, and amorphous carbon formed by electron beam deposition may be present at the apex of the probe.

According to some embodiments, there is provided a method of electrically connecting an SPM probe to a scanning probe microscope, wherein the probe includes a chip with at least one electrical contact, the method comprising:

electrically connecting a conductor to each contact, wherein each conductor comprises one or more metal tracks (e.g., layers comprising electrically conducting materials) supported by a substrate (e.g., a layer comprising an electrically insulating material) to define an elongated handle, wherein a first or distal end of each metal track is connected to a contact on the chip, and a second or proximal end of each metal track includes a contact adapted to be connected to the scanning probe microscope.

The one or more metal tracks (e.g., layers comprising electrically conducing materials) may be sandwiched between insulating layers (e.g., layers comprising electrically insulating materials).

The contact at the proximal end of each metal track may be adapted to be received in a standard connector, e.g., a ZIF connector (zero insertion force connector) or any wire-to-board connector.

The metal tracks, substrate, and any insulating layers may be defined by a flexible printed circuit board (PCB).

The method may further comprise coating all of the chip or a majority of the chip, and the elongated handle with an insulating coating (e.g., an electrically insulating coating).

The substrate may comprise a polyimide layer, the method further comprising applying a polymer over the chip and flexible PCB.

Further, according to some embodiments, there is provided a probe for a scanning probe microscope, comprising a chip that defines a cantilever (e.g., a mechanical resonator) with a sharp tip, and an elongated, flexible handle connected at a distal end to the chip, wherein the handle is configured to be picked up at a proximal end using human fingers, and is provided with sufficient rigidity to allow the chip to be manipulated by means of the handle and placed into an SPM holder.

The flexible handle may be configured to have a mass and flexibility sufficient to limit acoustic and mechanical vibrations from being transmitted by the handle to the chip, while providing sufficient rigidity to allow the chip to be guided into the SPM holder.

The handle may include one or more electrical conductors (e.g., layers comprising electrically conducting materials) extending between the distal and proximal ends of the handle for connecting contacts on the chip to the scanning probe microscope. Each conductor may comprise a metal track formed as part of a flexible printed circuit board (PCB). Each metal track may be sandwiched between insulating layers, and the chip and flexible PCB may be coated with an insulating coating.

Each metal track (e.g., layer comprising an electrically conducting material) may include a contact at the proximal end, adapted to be inserted into a standard connector.

Still further, there is provided a method of facilitating the handling of an SPM probe without the use of tweezers, comprising attaching a flexible, elongated handle to the probe, wherein the flexible handle is configured to have a mass and flexibility sufficient to limit acoustic and mechanical vibrations from being transmitted by the handle to the chip, while providing sufficient rigidity to allow the chip to be guided into the SPM holder.

The handle may support one or more conductors (e.g., one or more layers comprising an electrically conducting material) extending between a distal end of the handle and a proximal end.

The handle may be defined by a flexible printed circuit boards (PCB) that includes one or more metal tracks (e.g., one or more layers comprising an electrically conducting material) supported by an insulating substrate (e.g., a layer comprising an electrically insulating material), each metal track defining a conductor, and the PCB and probe may be coated with an insulating coating. The insulating substrate of the flexible PCB may, for example, be made of polyimide and the insulator coating may comprise a polymer coating that is deposited over the probe and PCB.

Multiple handles may be formed on a common substrate that defines a frame with break-away tabs connecting the handles to the frame.

The thickness of the PCB with its metal tracks (e.g., layers comprising electrically insulating materials) may be chosen so as not to interfere with the scanning probe microscope holder when the probe is placed in the holder.

Figure 4:
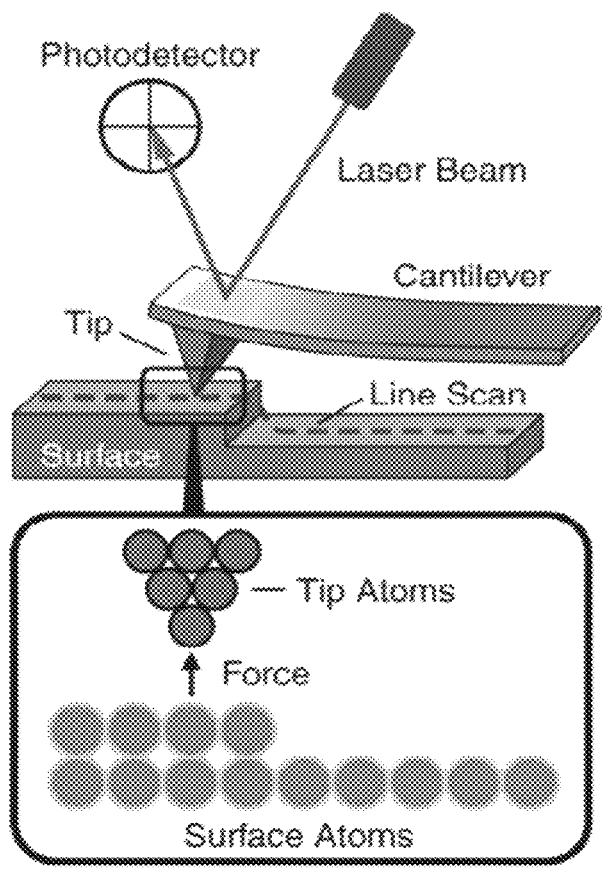
FIG. 4 is a three-dimensional representation of an SPM cantilever being scanned across a substrate, according to some embodiments.

For a better understanding of the technology, one type of scanning probe microscopy, known as atomic-force microscopy (AFM) or scanning probe force microscopy (SPFM) with demonstrated resolution on the order of fractions of a nanometer will be discussed here. The information is gathered by "feeling" or "touching" the surface with a mechanical probe as shown in FIG. 4. It may include piezoelectric elements to monitor the force and adjust the probe height for very precise scanning.

The AFM has three major applications: force measurement, imaging, and manipulation.

In force measurement, an AFM can be used to measure the forces between the probe and the sample as a function of their mutual separation. This can then be applied to perform force spectroscopy.

During imaging, the reaction of the probe to the forces that the sample imposes on it can be used to form an image of the three-dimensional shape (topography) of a sample surface at a high resolution. This is achieved by scanning the position of the sample with respect to the tip and recording the height of the probe that corresponds to a constant probe-sample interaction.

In the case of manipulation, the forces between tip and sample can also be used to change the properties of the sample in a controlled way. Examples of this include atomic manipulation, scanning probe lithography, and stimulation of cells.

In addition to the acquisition of topographical images, other properties of the sample can be measured locally and displayed as an image, including mechanical properties like stiffness or adhesion strength and electrical properties such as conductivity or surface potential. In fact, the majority of SPM techniques are extensions of AFM that use this modality.

While SPM is used mostly to determine the topography of a material, it can also provide other information such as surface potential, photoconductivity, catalytic activity, dielectric function, or even ion motion on working devices.

The major difference between SPM and optical microscopy or electron microscopy is that SPM does not make use of lenses or beam irradiation in all experiments. Therefore, for such experiments, it does not suffer from a limitation of space resolution due to diffraction limit and aberration, and it is not necessary to prepare a space for guiding the beam (by creating a vacuum) or to stain the sample.

However, since Scanning Probe Microscopy, as the name implies, may make use of probes that physically contact the sample being analyzed, there may be a need to replace the probes from time to time due to contamination or damage-typically with each new use. Therefore the probe, which includes a chip with a cantilever and a sharp tip at its end, regularly has to be replaced.

This creates the first challenge, since the probe comprises a chip, e.g. a silicon, glass, metal or polymer chip, which can be extremely small and/or fragile, and has traditionally been handled using tweezers. The result is that it is not uncommon that the chip is either dropped or damaged in an attempt to mount it in the instrument.

The second challenge involves measurements in liquid. Many applications, including those involved with energy storage, such as electrochemistry, require measurement in liquid, for example, scanning electro-chemical microscopy (SECM) is usually performed in liquid cells. Therefore, in order to be able to measure the tip current of the SPM probe, an electrical connection has to be made between the instrument and the tip, which avoids or reduces leakage current.

Figure 5:
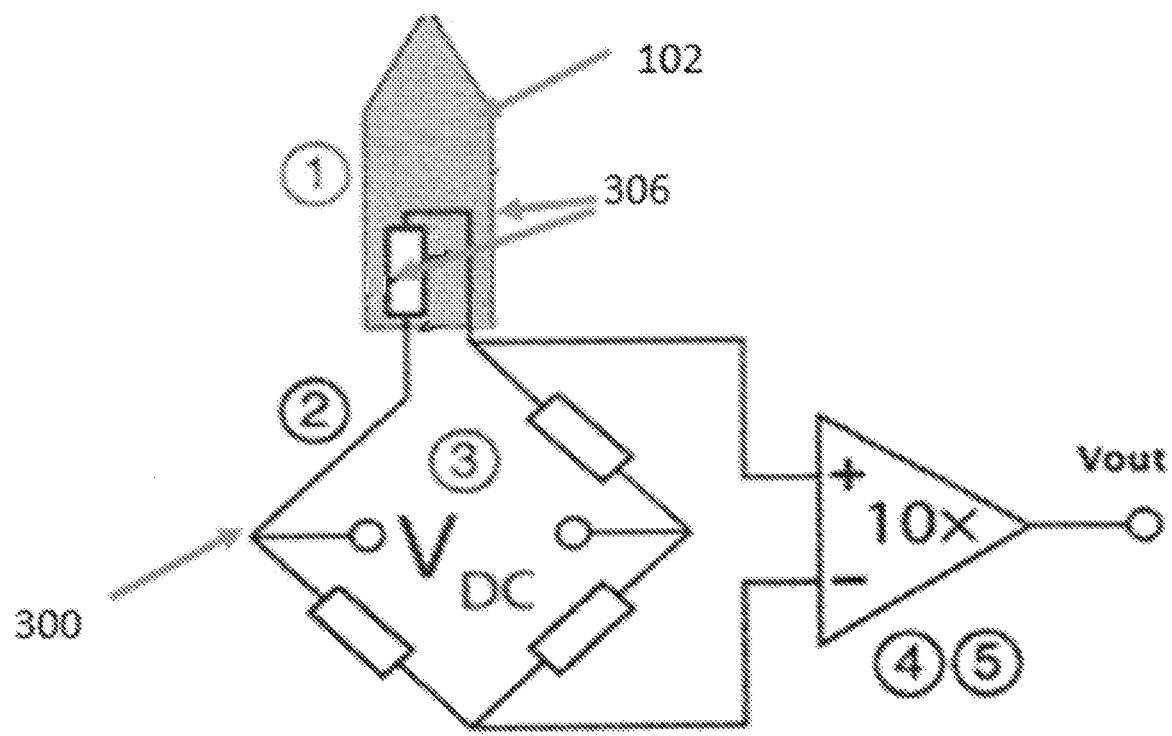
FIG. 5 is a circuit diagram of a Wheatstone bridge attached to an SPM probe, according to some embodiments.
Figure 6:
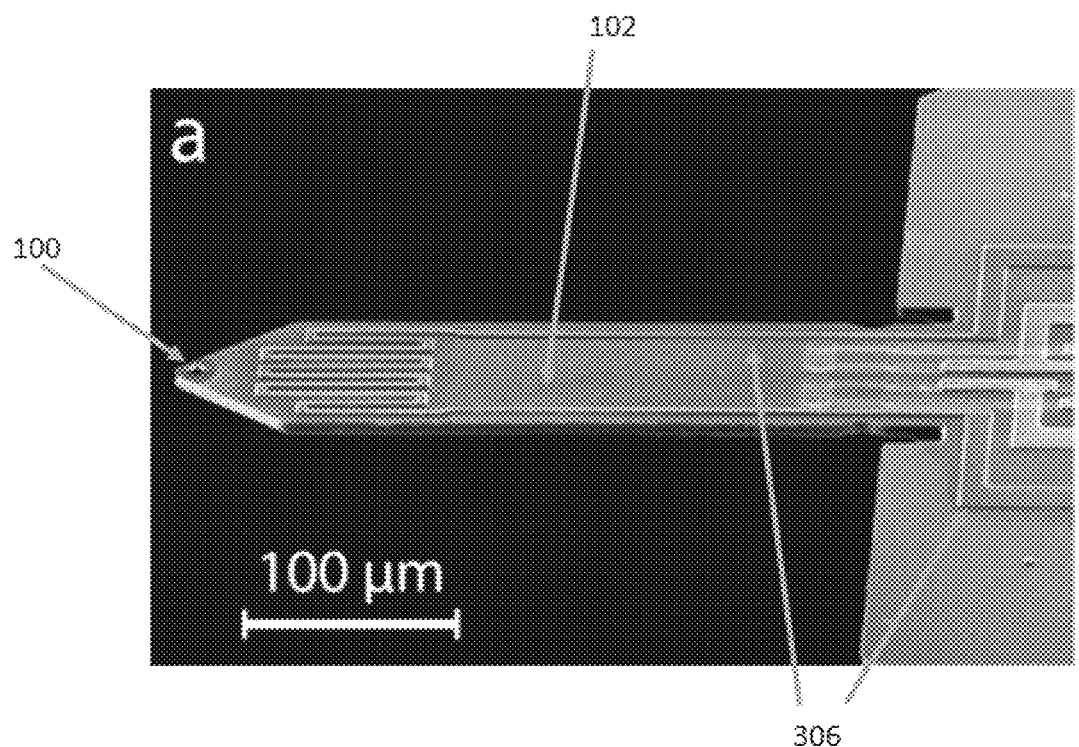
FIG. 6 is a three dimensional view of an AFM probe, according to some embodiments.

For example, an AFM probe with a piezo-resistive readout typically makes use of a Wheatstone bridge 300 (FIG. 5) to measure the deflection of the cantilever 102 (e.g., mechanical resonator) of the probe chip, with its tip 100 (FIG. 6). This requires two conductive tracks 306 (e.g., two layers comprising electrically insulating materials) in order to connect to two contacts on the probe chip. The tracks 306 extend along the cantilever of the probe to the Wheatstone bridge 300, wherein the Wheatstone bridge may be formed on the probe chip or provided separately (for example on a separate printed circuit board) so as to provide information to the instrument regarding the movement of the cantilever thereby allowing the force that the tip of the cantilever exerts on the substrate to be kept substantially constant by adjusting the distance of the tip from the substrate.

The present application therefore proposes at least the following two improvements to the probes for SPM: one directed at making the handling of the probe easier, and one directed at avoiding leakage current when making measurements in liquid, both of which are achieved using a handle as is described in greater detail below.

Figure 7:
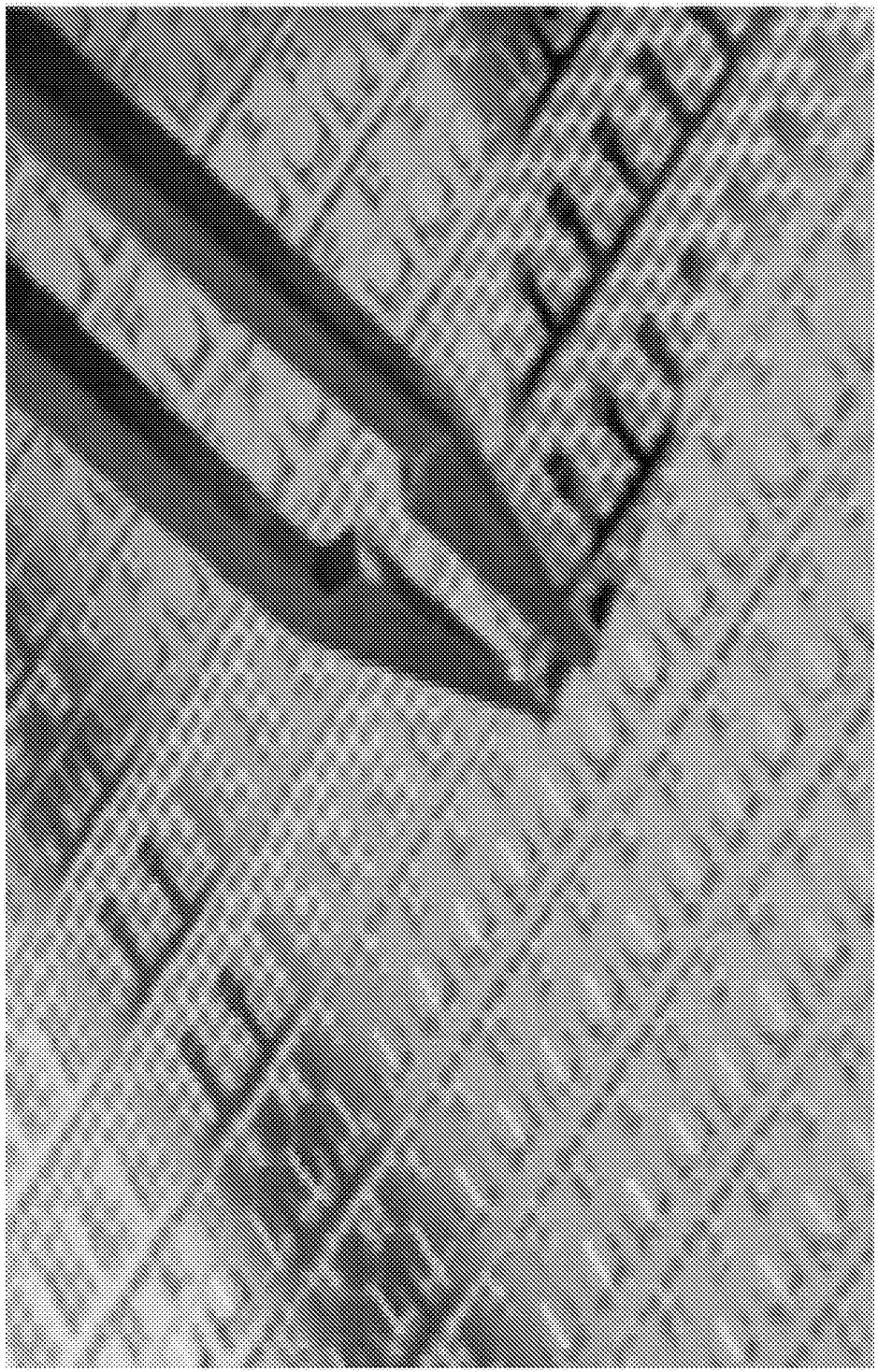
FIG. 7 shows method of picking out a probe chip using tweezers, according to some embodiments.

The insertion of the probe in the holder of the instrument is typically performed using precise handling, and the thin cantilever portion (e.g., mechanical resonator) of the probe can easily be destroyed if it touches any part of the holder. Also, the manipulation of probes with tweezers can result in chipping of the probe, and in the case of insulated cantilevers, the sharp tweezers can easily break fragile insulation layers. The traditional approach has therefore been not only time-consuming but costly, due to the large number of damaged probes resulting from the use of tweezers as shown in FIG. 7.

Figure 8A:
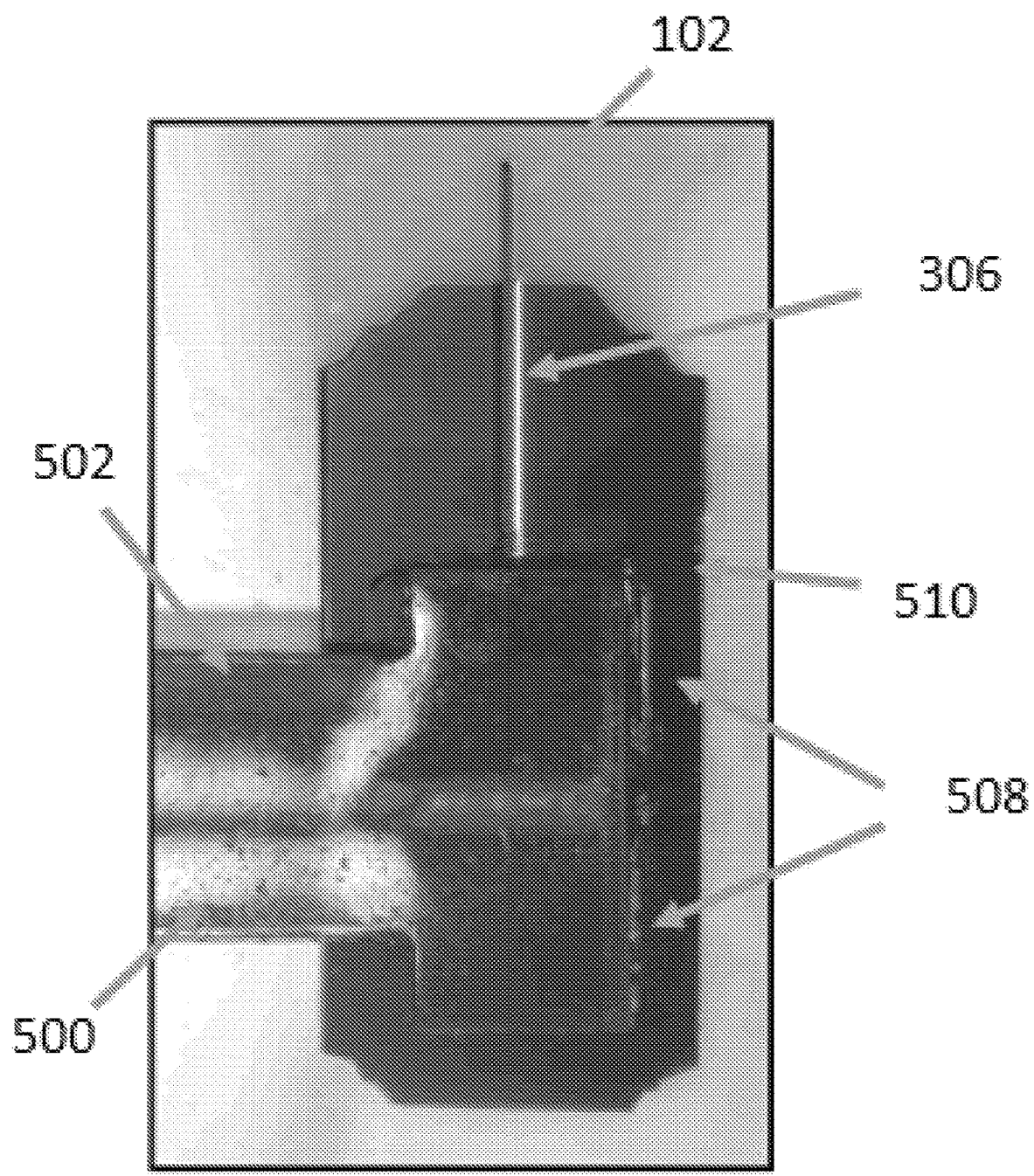
FIG. 8A is a three dimensional view of one embodiment of a chip connected to a handle for manipulating without tweezers, according to some embodiments.
Figure 8B:
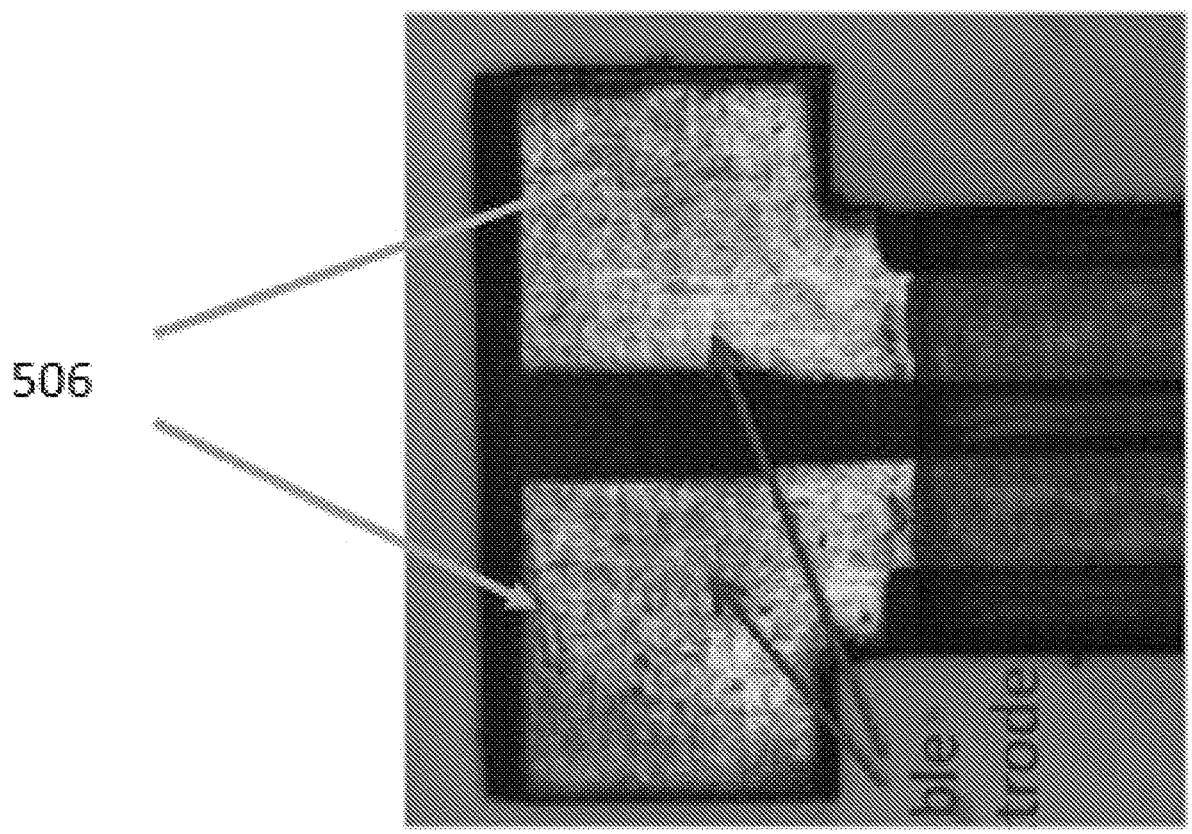
FIG. 8B is a top view showing a first or distal end of a handle having two metal contacts, according to some embodiments.

According to one embodiment, one or more conductors 500 and 502 (e.g., layers comprising electrically conducting materials) are affixed to the probe chip 510 as shown in FIG. 8A, to define a handle 600 (FIG. 9), as discussed in greater detail below, and which can then easily be grabbed with two fingers 610, in order to manipulate the probe without using tweezers, for purposes of placing the chip in the instrument holder. The conductors 500, 502 electrically connect with the probe chip by means of contact electrodes 506 (FIG. 8B) that are attached to contact electrodes 508 on the chip.

As mentioned above, some AFM probes require more than one electrical contact (e.g. piezo-resistive probes). They will therefore require more than one contact as shown in this embodiment.

One embodiment of the invention includes the use of a thin flexible handle, such as a polymeric handle, which is attached to a probe chip, which may be attached to the chip without conductors (e.g., without layers comprising electrically conducting materials).

Figure 9:
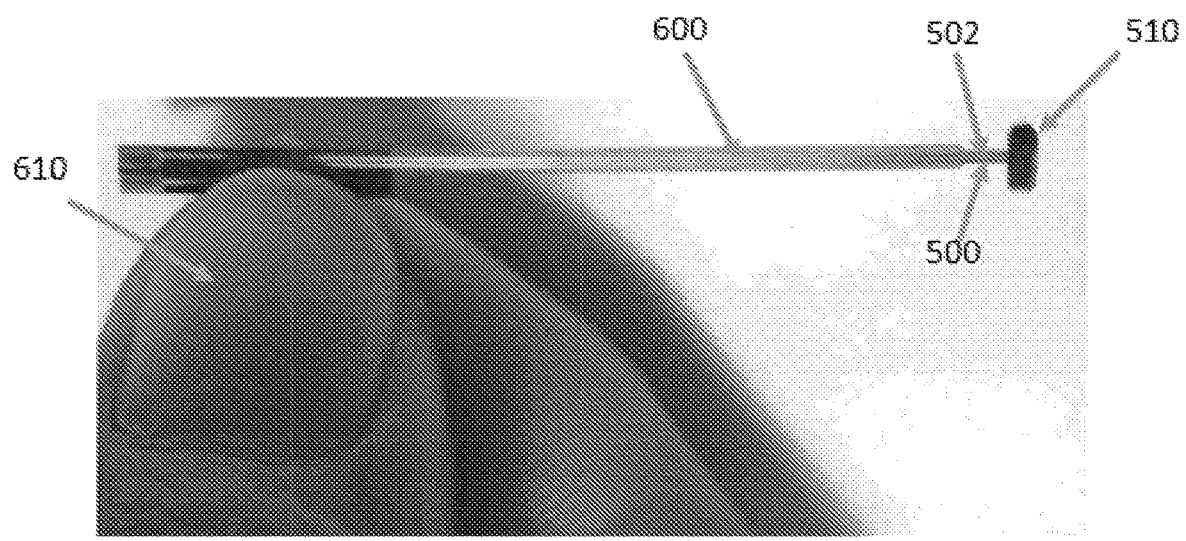
FIG. 9 is a three dimensional view of a handle connected to a chip, according to some embodiments.

However, in the embodiment of FIGS. 8-9, the conductors 500 and 502 form part of the flexible handle (e.g., the handle comprises two layers comprising electrically conducting materials), thereby also providing a means to establish reliable electrical contact between the instrument holder and the chip.

In order to allow the probe to be used in liquid environments, one embodiment makes use of an insulating layer that is deposited over the handle and chip, for example, by means of chemical vapor deposition (CVD), dip coating, or spray coating. The insulating layer may be an insulating coating.

When using SPM probes in liquids it may be beneficial to have leakage current free, fully insulated, electrical contact with the chip. By making use of a handle, in accordance with some embodiments that include electrical conductors (e.g., some embodiments that include layers comprising electrically conducting materials), the measurements taken using the measurement-sensitive tip 100 (FIGS. 4 and 6) can be electrically connected via the handle (such as handle 600 shown in FIG. 9), as is discussed in greater detail below.

The chip 510, which defines the probe can, for example, be a semiconductor chip, glass chip, metal chip, or polymer chip. The chip contact electrodes 508 can be electrically connected to the contacts 1100 of the handle conductors 500 and 502 by soldering or using conductive glue or paste.

Furthermore, by implementing the handle as a thin handle that is only a few tens of microns thick, e.g. a polyimide handle, the handle may not interfere with the clamp of the tip holder.

When the handle is provided with electrical contacts (e.g., one or more layers comprising electrically conducting materials that are not completely covered by an insulating material), it may applicable to a wide range of scanning probe technologies that require electrical contacts, such as self-sensing (mostly piezo-resistive) cantilevers, heated cantilevers, thermal cantilevers, magnetic actuation excitation such as iDrive by Asylum Research an Oxford Instruments Company, and electrostatic excitation probes.

In some embodiments, contact electrodes may be fabricated on the top side of the chip.

Embodiments available for use with probes on any instrument without requiring specialized holders may be advantageous. These embodiments may outperform methods requiring wire bonding onto specially designed holders and/or may be compatible with a variety of instrument manufacturers.

Handle Configuration:

One aspect of the handle, in some embodiments, is that it is configured to be easily grabbed by two fingers and is stiff enough to be able to transmit sufficient force to the chip to allow it to be to insert into a holder on the instrument.

However, it may be beneficial for the handle to avoid transmitting acoustic and mechanical vibrations to the chip. Therefore, in some embodiments, the handle is configured to have a mass and flexibility sufficient to limit acoustic and other mechanical vibrations from being transmitted by the handle to the probe, while providing sufficient rigidity to allow the probe to be guided into a scanning probe microscope tip holder.

Several embodiments of handles of the present application are discussed below, making use of insulating layers (e.g., layers comprising electrically insulating materials) and insulating coatings. However, metal layers such as copper or aluminum layers can also be used to add mass and rigidity. It will be appreciated that when such metal layers are added, it may be beneficial to include an insulating layer between the metal layers and any conductive tracks, which may be included in the handle, as discussed further below.

One of the features of the handle of the present application, in some embodiments, is that it is configured to remain within the permitted thickness constraints of existing holders.

The second aspect of the handle is that, in some embodiments, it affords electrical connection between the probe (chip) and the instrument. In one embodiment, the handle includes one or more conductive tracks (e.g., one or more layers comprising electrically conducting materials) to provide a reliable electrical contact between the instrument and the chip, independent of which instrument or holder is used. This electrical connectivity may be particularly challenging in a liquid environment. Therefore, it may be advantageous for the handle to be mounted as a feed through from the instrument to the liquid cell without causing leaks. It may be beneficial for the handle to be connected, at its proximal end, to the instrument in a non-permanent way, since it may be desirable for the user to be able to remove the probe with its cantilever, from the holder once the measurement is done.

Figure 10:
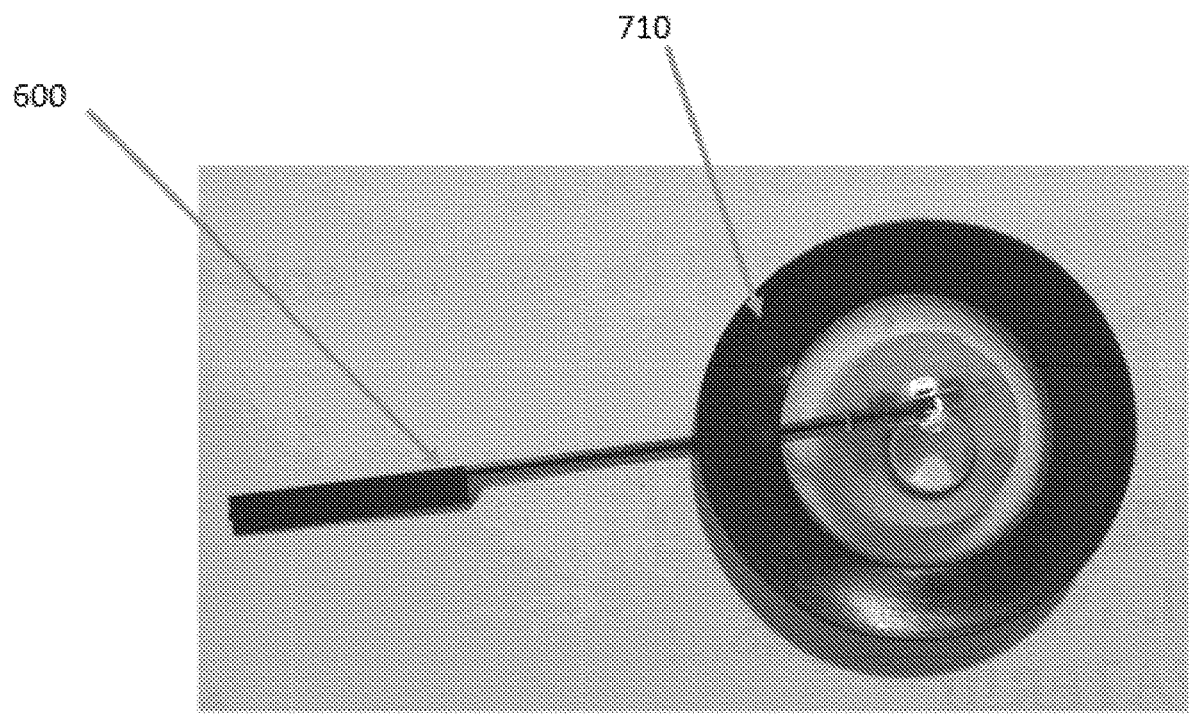
FIG. 10 is a three dimensional view of an AFM liquid cell with a handle, according to some embodiments.

In the case of the AFM tip holder for liquid cell by Bruker the handle 600 of the present application can be inserted under the sealing material 710 of the cell, as shown in FIG. 10, without causing any liquid leaks during the measurement.

Also, in some embodiments, the handle is configured so as to avoid interfering with the measurements. This means that, in some embodiments, it is configured not to extend into the optical path of the laser; not to cause mechanical perturbation; and/or not to touch the sample/electrode in the liquid cell. In one embodiment an L-shaped handle was chosen, with the handle extending perpendicular to the insertion direction of the chip, thereby allowing the chip to be inserted into a holder by holding the handle perpendicular to the insertion direction. In some embodiments, this ensures that the handle cannot touch the cantilever of the probe as the cantilever moves, and does not obstruct the slot/clamp of the holder. This configuration is shown in FIGS. 11-13 below.

Parallel Fabrication:

Regarding the fabrication process, some embodiments relate to methods of scaling the fabrication of the probes, which will also be referred to herein as parallel processing.

Figure 11:
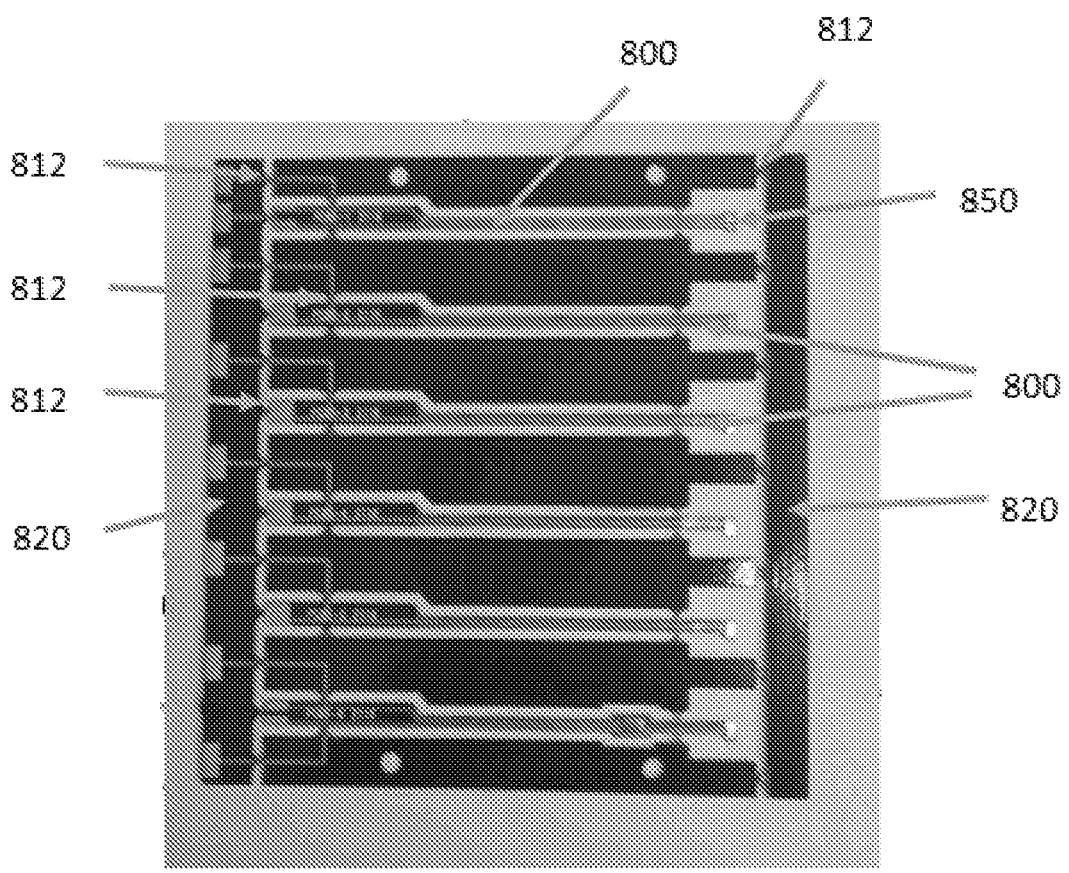
FIG. 11 is a top view of a frame and a handle, according to some embodiments.
Figure 12:
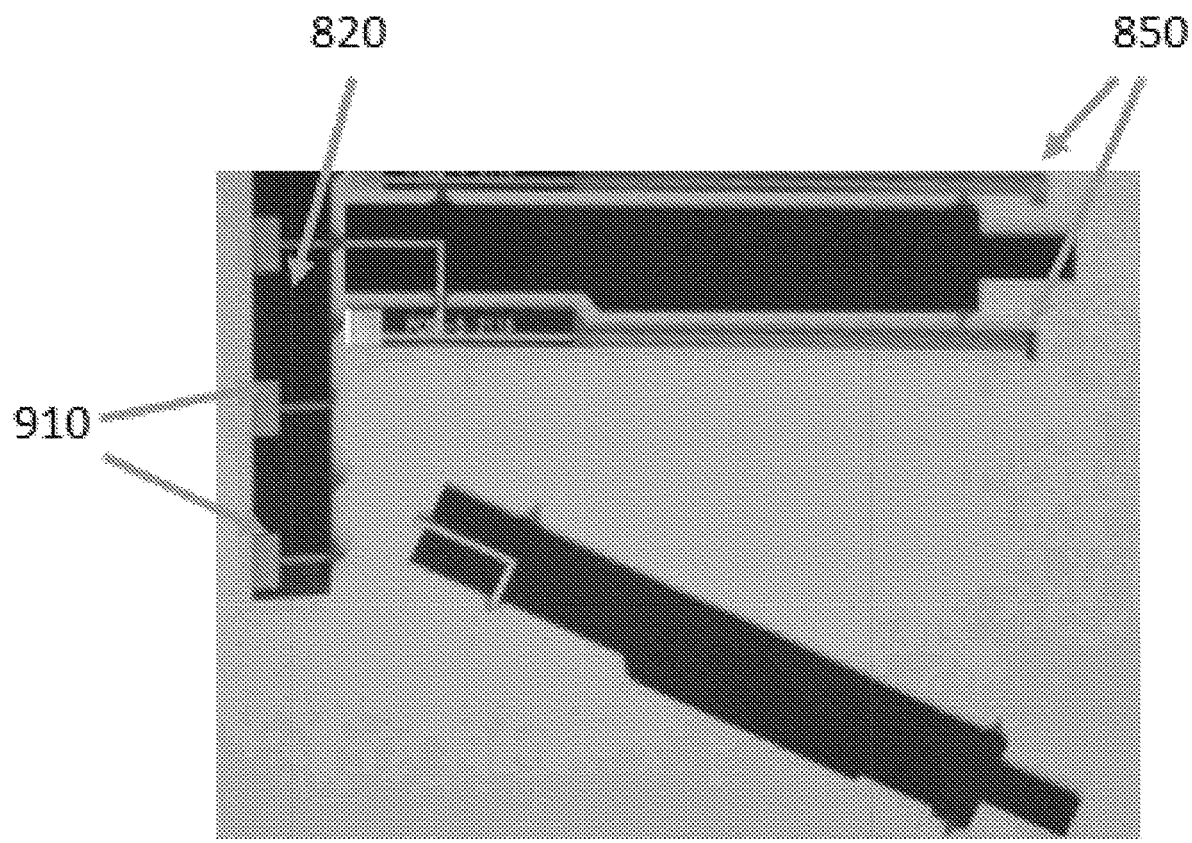
FIG. 12 is a top view of a frame and a handle, according to some embodiments.
Figure 13:
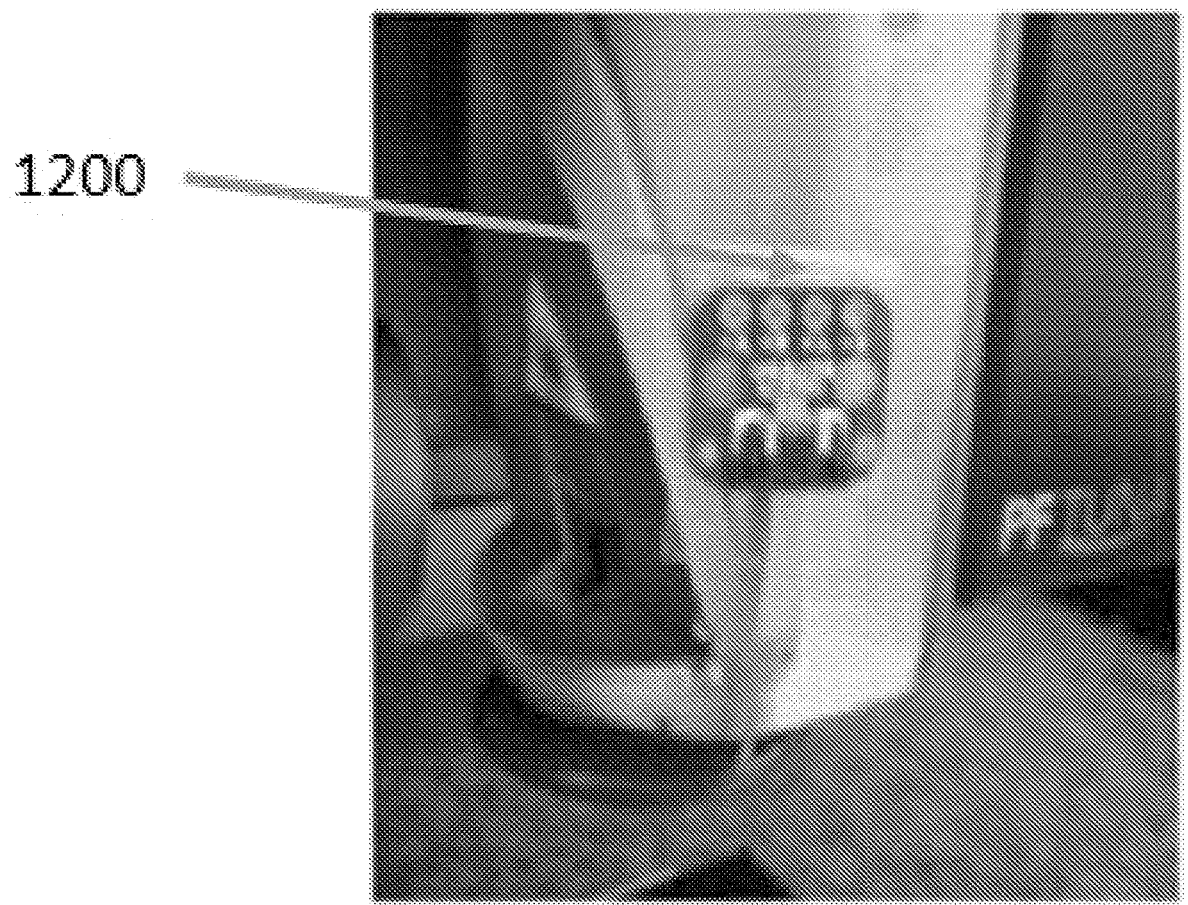
FIG. 13 is a three dimensional view showing a printed circuit board with a zero insertion force wire-to-board connector attached to a scanning probe microscope, according to some embodiments.

By making use of a frame, such as the embodiment shown in FIGS. 11-12, some embodiments allow for parallel processing of the chips with their handles. The frame 810 with its end pieces 820 and intermediate pieces 822 (discussed in greater detail below with respect to FIG. 11) and the handles 800 are made using a flexible printed circuit board (PCB) process. The PCB technology may allow several handles to be formed on a common PCB substrate, wherein the individual handles 800 are retained in a frame 810, thereby making parallel processing possible by performing process steps on the frame-and-handle structure as a whole. Once completed, in some embodiments, each handle 800 is either detached from the frame by breaking the tabs 812 that hold the handles 800 to the frame 810 in place (as shown in FIG. 12), and then packed and shipped, or the whole frame 810 with its handles 800 still in place, is sent to the final user.

In the embodiment of FIGS. 11-12, the frame 820 holds six handles 800.

The configuration of the supporting frame 810 with its tabs 812 for detachably holding the handles 800 has been designed in order to make it easier to detach the handles. The frame 820, in this embodiment, is made with removable end pieces 820 and removable intermediate pieces 822 attached to the handles 800 by 0.5 mm wide tabs 812. One can easily break the tabs 812 and selectively remove the frame pieces and handles 800 one by one, as shown in FIG. 13. This process requires no tools and only requires movement of the pieces in the XY-plane, thereby avoiding the need to twist any of the pieces.

Figure 14:
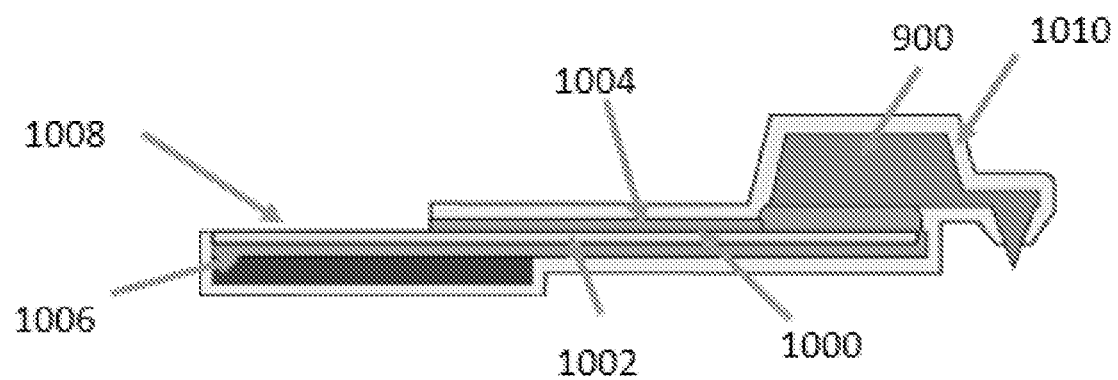
FIG. 14 is a sectional side view depiction of a handle, according to some embodiments.

As shown in greater detail in FIG. 14, in some embodiments, the PCB is provided with a thin copper track 1000 (e.g., a layer comprising an electrically conducting material when the electrically conducting material is copper) that runs between two insulating layers 1002 and 1004 (e.g., two layers comprising electrically insulating materials) as shown in the cross-section of FIG. 14. In one embodiment, the copper track 1000 is etched onto a Polyimide layer 1002, which is itself an insulating substrate and can define one of the insulating layers. The etching of the copper track may be achieved by traditional photolithographic techniques, whereafter the insulating layer 1004 is place over the track 1000 to sandwich the track 1000 between the layers 1002 and 1004. It will be appreciated that more than one conductive layer (e.g. copper layers) could be provided, that are sandwiched between insulating layers.

In one embodiment separate insulating layers or membranes (not shown) are applied over the top copper layer (if there are multiple copper layers) and under the substrate. In such an embodiment the insulating membrane applied over the top copper layer may be used to define the insulating layer 1004, thereby avoiding the need for both an insulating layer and an insulating membrane on top of one another.

In this embodiment a Polyimide stiffener 1006 is added to both the main frame structure that supports the handles, and to the large gold pads located at the proximal end 1008 of the handle that will be held by the user. The Polyimide provides the frame and proximal end of the handle with additional stiffness in this embodiment.

Another aspect of the present application is the provision of an insulating coating that can be added to insulate the chip and handle, as depicted in this embodiment by reference numeral 1010. This is discussed in greater detail below.

A further benefit of the embodiment shown in FIGS. 11-12 is the extension of the copper tracks 1000 (e.g., layers comprising an electrically conducting material when the electrically conducting material is copper) to the frame 810, which includes additional gold pads 910. This allows the whole frame 810, together with all of the handles 800, to be connected to an electrical connector to electrically test each cantilever of each probe chip at the end of its fabrication process.

In the embodiment shown in FIGS. 11-12 the chips extend perpendicularly to the handles to define an L-shaped configuration, but it will be appreciated that other configurations can be adopted.

Figure 15:
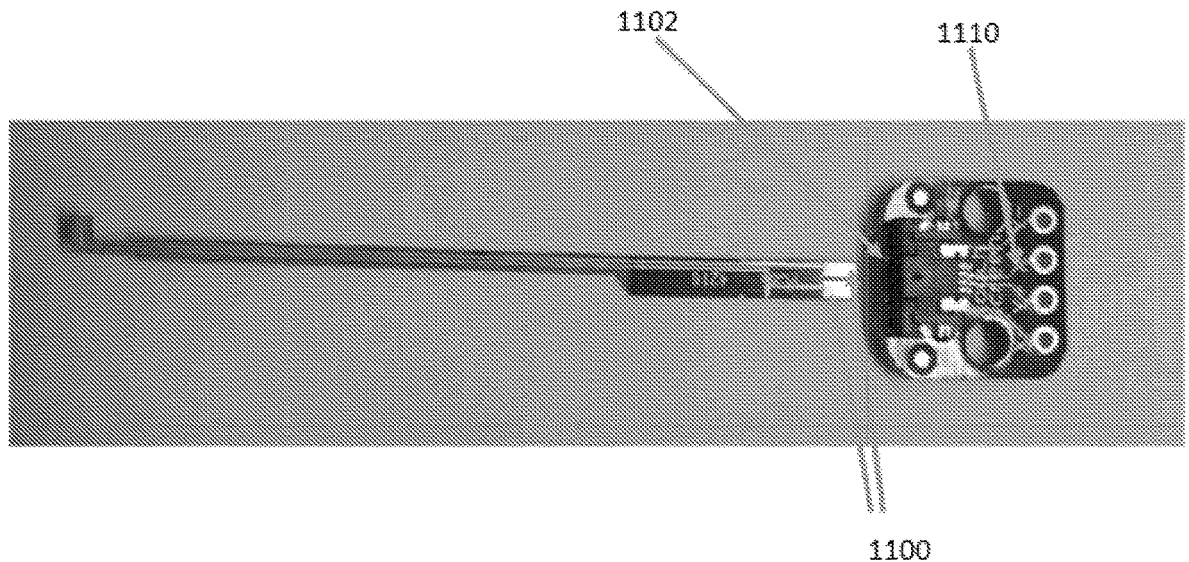
FIG. 15 is a three dimensional view of a handle inserted into a zero insertion force wire-to-board connector on a printed circuit board, according to some embodiments.

Another feature of the application pertains to the electrical contacts (which take the form of gold pads 1100 as shown in FIG. 15) on the handle at a second or proximal end of the handle, furthest from the chip end. (The chip end defines the first or distal end of the handle). To allow for easy connection to an instrument, it may be beneficial for the thickness of the gold pads 1100 to be small enough to allow the pads to fit into a suitable connector, typically a wire-to-board connector, such as a Zero Insertion Force (ZIF) wire-to-board connector 1102 (FIG. 13), which is, in turn, mounted on a separate printed circuit board 1110, and can be attached to the instrument by any suitable means, e.g. tape 1200, as shown in FIG. 13, while appropriate wiring is provided between the connector 1102 and the input of subsequent circuitry as known in the art, such as a current amplifier.

Bonding of the Chip to the Handle

Another aspect of the application is the bonding of the probe chip to the handle to ensure electrical reliability, mechanical strength, sufficient thinness, and compatibility with insulated cantilever fabrication processes. One solutions found to work well for this purpose was conductive glue.

Choice of the Insulation Layer

As mentioned above, one aspect of the invention is to insulate the chip and handle. The insulation coating 1010 (e.g., an insulating coating) is deposited over the chip and the handle.

In one embodiment a polymer was deposited using a Chemical Vapor Deposition (CVD) process. Spin coating and dip coating are two other possible techniques, but CVD tends to provide a more uniform coverage, ensuring that even the smallest features are covered.

In one embodiment Parylene C was chosen as the polymer, and was deposited using the Gorham process. Parylene C is a semi-crystalline polymer used as an insulation layer in applications like aviation, electronics and medical technologies for its robustness against chemicals, its high melting point and its bio-compatibility.

Other insulating coatings such as epoxy resins, with or without glass fiber reinforcements can be used.

While the present invention was described specifically with respect to two embodiments and referring at times to AFM, it will be appreciated that other embodiments can be devised, using other materials and connection methods, without departing from the scope of the invention.

Example 1

Electrochemical processes may affect corrosion, energy storage, catalysis, and/or biology. Beyond topography, scanning electrochemical microscopy (AFM-SECM) may allow for localized measurements of reaction rates and/or currents generated from redox active molecules. Here, scanning probe microscopy probes in accordance with some embodiments are employed to measure electroactive species being generated at the sample surface. By probing a micro electrode array in sample generation-tip collection mode, electrical currents on the order of a few pA are observed and both active and inactive electrodes are easily identified.

Chemical and biological processes that occur at solid-liquid and liquid-liquid interfaces typically involve charge transport or storage. Understanding the electrochemical dynamics at these interfaces may be beneficial for a variety of applications ranging from electrochemical problems in corrosion, energy storage, catalysis, and sensing, to biological applications that include mass transport across membranes, cells, and intercellular signaling. Nanoscale electrochemical reactivities may govern the macroscale performance, function, lifetime, and/or failure of a system. Scanning electrochemical microscopy (SECM) may provide structural and electrochemical information simultaneously at the nanometer length scale.

In AFM-SECM, the electrode current is measured as it is scanned over a surface and perturbations in this current are collected to learn about electrochemistry occurring with the sample. For reliable measurements, it is beneficial for the electrode to be fully insulated with the exception of the tip apex; without insulation the electric field in polar solvents such as water may become delocalized. Measurements made without insulation may include noise that is several orders of magnitude higher compared than those made with insulated probes. Additionally, sharp tip geometries may increase the resolution at which measurements can be obtained.

There are several modes of operation in SECM experiments, as current can be monitored at the tip and/or sample and the electroactive species can undergo a reaction at either or both surfaces depending on the voltages chosen and the chemistry of the system. In tip collection-substrate generation mode, the redox mediator is converted at the substrate surface and when the tip comes into close proximity to the converted species, the tip then converts the species back to complete the circuit and generate a current. This Example shows results obtained from performing SECM in tip-collection sample-generation mode on a microelectrode array using the scanning probe microscopy probes described herein to demonstrate the probe capabilities for electrochemical applications.

Figure 16A:
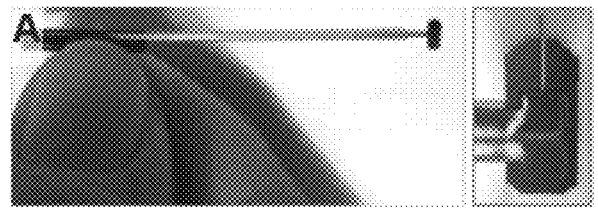
FIGS. 16A, 16B and 16C show micrographs of scanning probe microscopy probes, according to some embodiments.
Figure 16B:
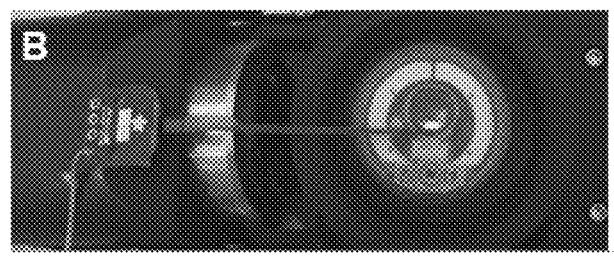
Figure 16C:
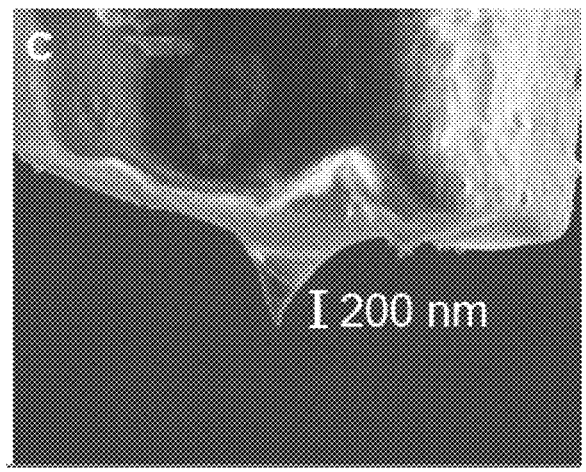

The scanning probe microscopy probes employed in this Example are fully insulated with only the apex of the tip is exposed (FIG. 16C). The electrical contact to the tip features a flexible handle that is easily inserted into a connector and can accommodate a variety of instruments (FIGS. 16A-16B). Each cantilever is individually characterized for electrical performance to verify the absence of current leakage and to estimate the area of the exposed tip.

To evaluate the electrical performance of the cantilever, tip collection-sample generation mode measurements were made in $Ru(NH_3)_6Cl_3$ with a $KNO_3$ supporting electrolyte using an Asylum Research MFP-3D atomic force microscope. In this solution, the electroactive species were predominantly oxidized. When the substrate was held at the switching potential, the substrate reduced the oxidized species in solution and subsequently collected them at the tip as shown in FIG. 17A and in the equations (assuming that only O species are initially in the solution):

Substrate Reaction: $O + ne^- \rightarrow R$ 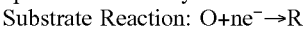

Tip Reaction: $R - ne^- \rightarrow O$ 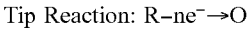

Figure 17A:
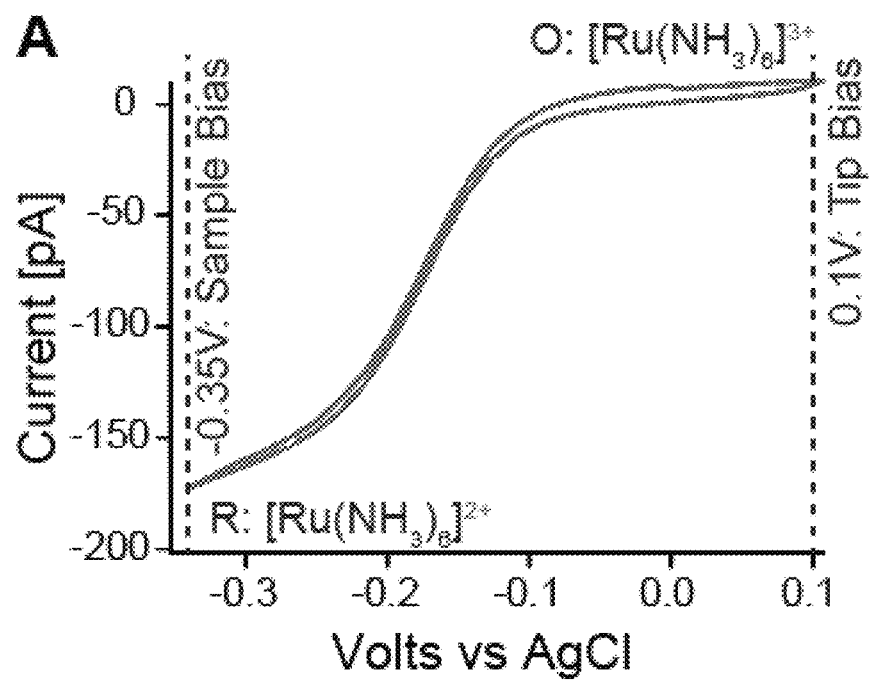
FIG. 17A shows a cyclic voltammogram, according to some embodiments.

A typical cyclic voltammogram from a scanning probe microscopy probe comprising a platinum counter electrode and AgCl reference electrode is shown in FIG. 17A. The sample bias is set to −0.35 V vs AgCl to reduce $[Ru(NH_3)_6]^{3+}$ and the tip voltage was set to 0.1 V vs AgCl to oxidize $[Ru(NH_3)_6]^{2+}$.

Figure 18A:
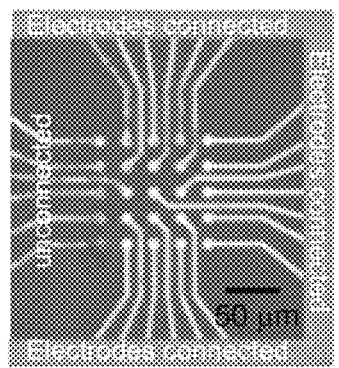
FIG. 18A shows a micrograph of a microelectrode array, according to some embodiments.

The micro electrode array sample used in this Experiment includes a 5×5 array of circular platinum electrodes each 5 μm in diameter (FIG. 18A). The electrodes on the left were inactive (floating) while all other electrodes were connected as working electrodes.

Figure 17B:
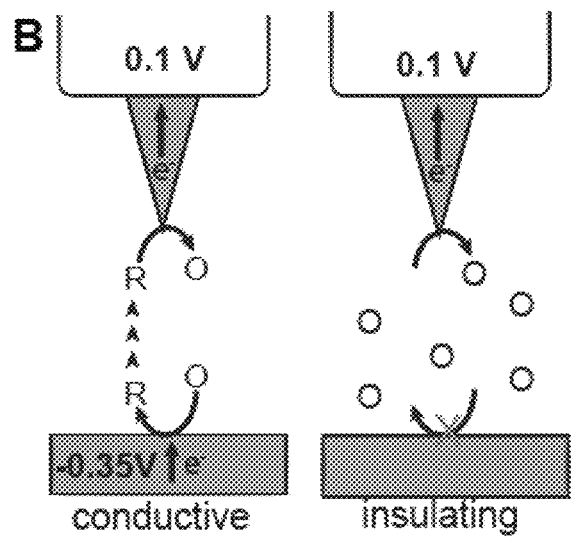
FIG. 17B shows a schematic representation of a method of operating a scanning probe microscope, according to some embodiments.
Figure 17C:
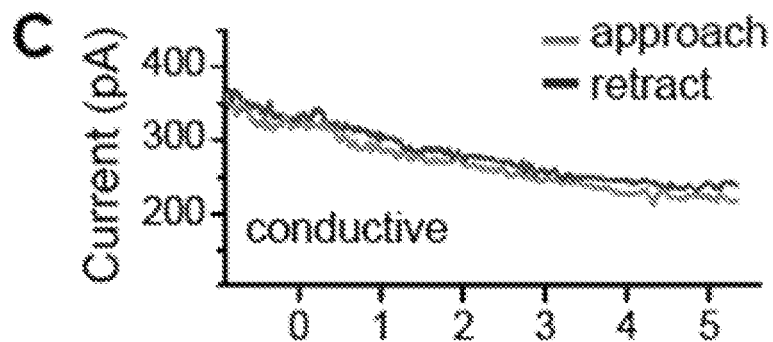
FIGS. 17C and 17D show current as a function of tip distance from a sample, according to some embodiments.
Figure 17D:
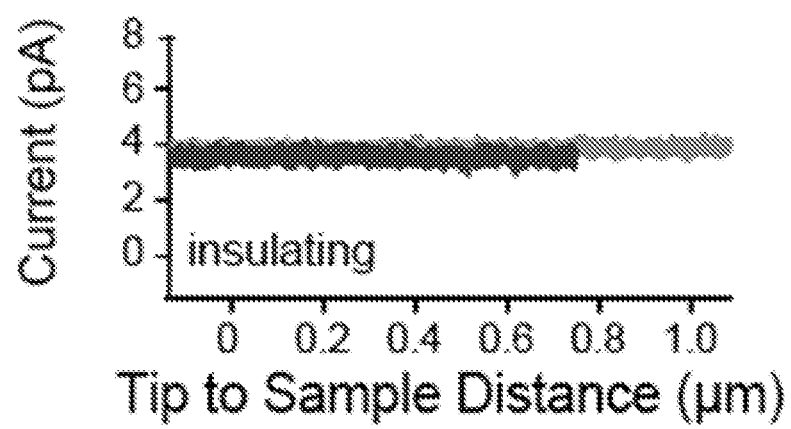

Tip currents during approach and retract curves were recorded over conductive platinum and an insulated area (FIGS. 17C-17D). The tip and sample were biased at 0.1 V vs AgCl and −0.35 V vs AgCl, respectively in a solution of 5 mM $[Ru(NH_3)_6]^{3+}$ and 100 mM $KNO_3$. There was a significant difference in the absolute value of tip current when over a conducting surface (~200 pA) compared to an insulating surface (~4 pA). As the nanoelectrode was brought closer to the conductive surface an increase in current was observed. Without wishing to be bound by any particular theory, it is believed that this increase in current occurs because the connected electrode constantly produced reduced species which were then collected by the tip to generate a current. Conversely, as the tip approached the insulating layer, it is believed that no species were being generated and therefore no change in current was observed (shown schematically in FIG. 17B).

Figure 18B:
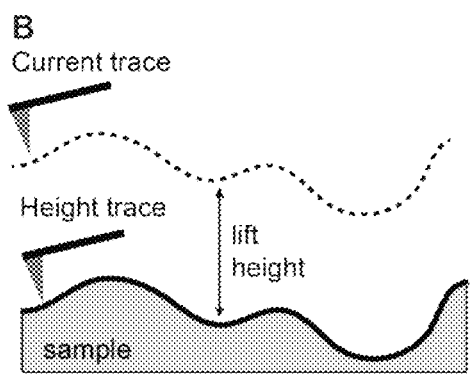
FIG. 18B shows a schematic depiction of a method of making a scanning probe microscopy measurement, according to some embodiments.
Figure 18C:
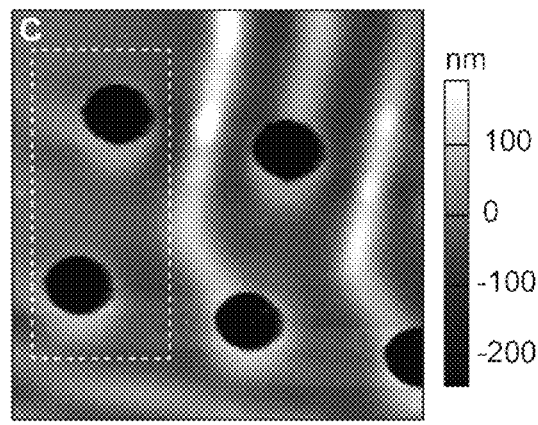
FIGS. 18C and 18D show scanning probe microscopy measurements, according to some embodiments.
Figure 18D:
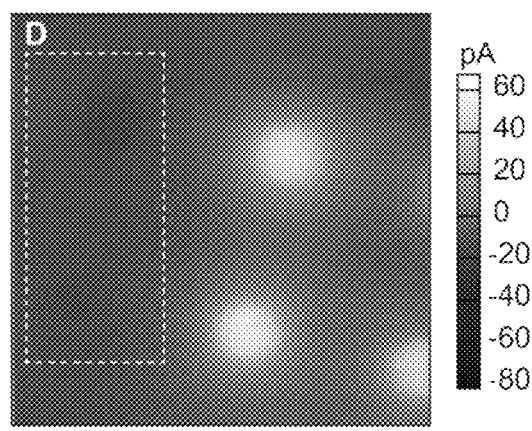

To probe the spatial distribution of the electroactive species, a topography image was obtained using tapping mode and a second electrochemical image was acquired at a lift height of 200 nm and tip current was monitored (FIG. 18B). The topography shows clear 5 micron diameter electrodes and the electrical leads connecting to the electrode that are under the insulating layer. The insulating layer measured approximately 1 micron in height from the electrode surface to the surface of the insulation (FIG. 18C). The SECM current image was performed with a sample biased at −0.35 V vs AgCl to reduce the oxidized species in solution and the tip was biased at 0.1 V vs AgCl to oxidize the species generated by the sample. Clear regions of increased current were observed over connected electrodes and no increase in current was observed over the platinum electrodes that were left unbiased (FIG. 18D).

Several experiments were performed by employing scanning probe microscopy probes described herein to sense a micro-electrode array with platinum electrodes surrounded by insulation. Topography was collected in tapping mode and the SECM current was obtained in lift mode. The topography image showed an array of electrodes and once the electrochemical map of the surface was obtained the connected and unconnected platinum electrodes could be clearly distinguished.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A scanning probe microscopy probe, comprising:
   a chip;
   a mechanical resonator attached to the chip;
   a tip attached to the mechanical resonator; and
   a handle attached to the chip;
   a coating covering both the chip and the handle;
   wherein a portion of the handle distal to the chip and electrically connected to the chip is configured to make an electrical connection with an electrical controller;
   wherein the electrical controller is positioned on a scanning probe microscope;
   wherein the electrical connection is a zero insertion force connection;
   wherein at least a portion of the handle comprises a stiffener;
   wherein the stiffener comprises a polyimide;
   wherein the stiffener comprises fiberglass;
   wherein the handle comprises a printed circuit board;

wherein the coating comprises a polymer;
wherein the handle and chip together have a thickness of less than or equal to 600 microns;
wherein the coating comprises polyxylylene, a polyester, polyethylene, polyvinyl chloride, polypropylene, a polyacrylic, a polycellulosic, a polycarbonate, a polystyrene, a polyamide, a polyimide, polyacetonitrile, polymethylmethacrylate, cellulose acetate butyrate, polycarbonate, glycol modified polyethylene terphthalate, polystyrene, styrene butadiene copolymer, a crosslinked novolac epoxy and/or crosslinked Bisphenol;
wherein the coating comprises silicon oxide, silicon nitride, titanium oxide, aluminum oxide, and/or diamond;
wherein a leakage current through the coating is less than or equal to 10 nA;
wherein the probe has a parasitic capacitance of less than or equal to 1 nF.

2. The scanning probe microscopy probe according to claim 1, wherein the handle has a length of at least 5 mm and an average thickness of less than or equal to 500 microns.

3. The scanning probe microscopy probe according to claim 1, wherein the handle is configured to electrically connect a portion of the chip to a portion of the handle distal from the chip.

4. The scanning probe microscopy probe according to claim 3, wherein the electrical connection is made by an electrically conducting material.

5. The scanning probe microscopy probe according to claim 3, wherein the portion of the chip is an electrode;
wherein the electrode is a counter electrode.

6. The scanning probe microscopy probe according to claim 2, further comprising an insulating coating covering both the chip and the handle.

7. The scanning probe microscopy probe according to claim 5, wherein the electrode is a reference electrode.

8. The scanning probe microscopy probe according to claim 3, wherein the portion of the chip is an electrically conducting material electrically connecting a portion of the tip to the handle.

9. The scanning probe microscopy probe according to claim 8, wherein the portion of the tip is an electrode.

10. The scanning probe microscopy probe according to claim 1, wherein the handle is configured to electrically connect two or more portions of the chip to a portion of the handle distal from the chip.

11. The scanning probe microscopy probe according to claim 10, wherein the two or more portions are not in electrical connection with each other.

12. The scanning probe microscopy probe according to claim 1, wherein the handle is insulated in locations where it is not configured to make an electrical connection.

13. The scanning probe microscopy probe according to claim 12, wherein the insulation comprises one or more layers comprising an insulating material.

14. The scanning probe microscopy probe according to claim 13, wherein the insulating material is impermeable to a fluid.

15. The scanning probe microscopy probe according to claim 14, wherein the fluid comprises water.

16. The scanning probe microscopy probe according to claim 14, wherein the fluid comprises an organic solvent.

17. The scanning probe microscopy probe according to claim 13, wherein the insulating material comprises a polymer
wherein the polymer is a polyimide.

* * * * *